United States Patent
Ly et al.

(10) Patent No.: US 10,404,811 B2
(45) Date of Patent: Sep. 3, 2019

(54) METHODS AND APPARATUSES FOR RESTFUL BATCH SERVICES

(71) Applicant: IOT HOLDINGS, INC., Wilmington, DE (US)

(72) Inventors: Quang Ly, North Wales, PA (US); Dale N. Seed, Allentown, PA (US); Chonggang Wang, Princeton, NJ (US); Lijun Dong, San Diego, CA (US); Guang Lu, Thornhill (CA)

(73) Assignee: IOT HOLDINGS, INC., Wilmington, DE (US)

( * ) Notice: Subject to any disclaimer, the term of this patent is extended or adjusted under 35 U.S.C. 154(b) by 162 days.

(21) Appl. No.: 14/766,495

(22) PCT Filed: Feb. 4, 2014

(86) PCT No.: PCT/US2014/014642
§ 371 (c)(1),
(2) Date: Aug. 7, 2015

(87) PCT Pub. No.: WO2014/123884
PCT Pub. Date: Aug. 14, 2014

(65) Prior Publication Data
US 2015/0373127 A1    Dec. 24, 2015

Related U.S. Application Data

(60) Provisional application No. 61/762,133, filed on Feb. 7, 2013.

(51) Int. Cl.
*H04L 29/08* (2006.01)
*H04W 4/70* (2018.01)
(Continued)

(52) U.S. Cl.
CPC ............. *H04L 67/16* (2013.01); *H04L 67/32* (2013.01); *H04W 4/70* (2018.02);
(Continued)

(58) Field of Classification Search
CPC ... H04L 67/02; H04L 67/2833; H04L 67/289; H04L 67/142; H04L 67/125;
(Continued)

(56) References Cited

U.S. PATENT DOCUMENTS 9,015,284 B2    4/2015  Ukkola et al.
9,232,342 B2 *  1/2016  Seed ............... H04W 4/005
(Continued)

FOREIGN PATENT DOCUMENTS

CN    102387206 A    3/2012
EP    2 437 524      4/2012
JP    10254805 A     9/1998

OTHER PUBLICATIONS

Oasis, OBIX Version 1.1, Working Draft 06, pp. 1-75 (Jun. 8, 2010).
(Continued)

*Primary Examiner* — Jungwon Chang
(74) *Attorney, Agent, or Firm* — Volpe and Koenig, P.C.

(57) ABSTRACT

Apparatuses, computer readable media, and methods are disclosed for supporting services at an application service layer (ASL). The method may include responding to receiving batched requests from an entity by processing the batched requests, and sending a response to the batched requests to the entity. The method may include sending a separate response to each request indicated in the batched request to the entity, or sending a batched response. Two or more batched requests may have the same operation and the operation may be only specified once. The operation may be determined based on a name of the batched requests or an attribute of the batched request. The request may be deter-
(Continued)

mined to be a batch request based on a name of the batched request, attributes associated with the batched request, or an address to which the batched request is addressed. The ASL may be a service capability layer.

20 Claims, 22 Drawing Sheets

(51) Int. Cl.
  *H04W 8/08* (2009.01)
  *H04W 4/00* (2018.01)
  *H04L 29/06* (2006.01)
(52) U.S. Cl.
  CPC .......... *H04L 65/1073* (2013.01); *H04L 67/12* (2013.01); *H04L 67/125* (2013.01); *H04L 69/329* (2013.01); *H04W 4/00* (2013.01); *H04W 8/08* (2013.01)
(58) Field of Classification Search
  CPC ... H04L 9/0819; H04L 67/24; H04L 65/1016; H04L 63/20; H04L 67/16; H04L 67/32; H04L 67/12; H04L 69/329; H04L 65/1073; H04W 4/005; H04W 4/00; H04W 12/02; H04W 48/18; H04W 72/04; H04W 60/00; H04W 4/70; H04W 8/08; G06F 9/547; G06F 9/5038; G06F 17/30902; G06F 17/3089
  USPC ....... 709/203, 219, 226, 248, 223, 227, 228, 709/204; 455/435.1; 370/431, 329; 700/297; 713/155; 726/1, 4, 3
  See application file for complete search history.

(56) References Cited

U.S. PATENT DOCUMENTS

| | | | | |
|---|---|---|---|---|
| 2005/0080930 | A1* | 4/2005 | Joseph | G06F 9/5038 709/248 |
| 2008/0189774 | A1* | 8/2008 | Ansari | G06Q 30/04 726/7 |
| 2011/0066676 | A1* | 3/2011 | Kleyzit | G06F 17/30902 709/203 |
| 2011/0213871 | A1* | 9/2011 | DiGirolamo | H04W 4/00 709/223 |
| 2012/0047551 | A1* | 2/2012 | Pattar | H04W 4/00 726/1 |
| 2012/0173607 | A1* | 7/2012 | Connan | G06F 17/3089 709/203 |
| 2012/0198520 | A1* | 8/2012 | Cha | H04L 63/20 726/3 |
| 2012/0265983 | A1* | 10/2012 | Yegin | G06F 21/57 713/155 |
| 2013/0066965 | A1* | 3/2013 | Foti | H04L 67/24 709/204 |
| 2013/0103842 | A1† | 4/2013 | Seed et al. | |
| 2013/0151708 | A1* | 6/2013 | Shelby | H04L 67/025 709/226 |
| 2013/0160140 | A1* | 6/2013 | Jin | H04W 12/02 726/27 |
| 2013/0179583 | A1* | 7/2013 | Foti | H04L 65/1016 709/228 |
| 2013/0198340 | A1* | 8/2013 | Ukkola | H04L 67/02 709/219 |
| 2014/0064232 | A1* | 3/2014 | Chang | H04W 48/18 370/329 |
| 2015/0143472 | A1* | 5/2015 | Kim | H04W 48/02 726/4 |
| 2015/0245161 | A1* | 8/2015 | Pareglio | H04W 4/005 455/435.1 |

OTHER PUBLICATIONS subbu.org, "REST and Batch," (Feb. 3, 2008) available at https://www.subbu.org/blog/2008/02/rest-and-batch (last visited Jul. 20, 2016).
Fielding, "Architectural Styles and the Design of Network-based Software Architectures," PhD Dissertation, University of California, Irvine, pp. 1-180 (2000).
Google, "Sending Batch Requests," Google Cloud Storage, pp. 1-4 available at https://web.archive.org/web/20121018063801/https://developers.google.com/storage/docs/json_api/v1/how-tos/batch (Oct. 18, 2012).
Open Data Protocol, "OData: Batch Processing," pp. 1-6 available at https://web.archive.org/web/20130129185841/http://www.odata.org/documentation/batch (Jan. 29, 2013).
GITHUB, http-back-specs/batchhttp.xml available at https://github.com/apparentlymart/http-batch-specs/blob/master/batchhttp.xml (Apr. 4, 2009).
Shelby, "Constrained RESTful Environments (CoRE) Link Format," Internet Engineering Task Force (IETF), Request for Comments: 6690 (Aug. 2012).
European Telecommunications Standards Institute, "Machine-to-Machine communications (M2M); mIa, dIa and mId interfaces," ETSI TS 102 921 V1.1.1 (Feb. 2012).
European Telecommunications Standards Institute, "Machine-to-Machine communications (M2M); Functional architecture," ETSI 102 690 V1.1.11 (Dec. 2012).
European Telecommunications Standards Institute, "Machine-to-Machine communications (M2M); Functional architecture," ETSI 102 690 V1.1.3 (Feb. 2012).
European Telecommunications Standards Institute, "Machine-to-Machine communications (M2M); Functional architecture," ETSI 102 690 V1.1.1 (Oct. 2011).

* cited by examiner
† cited by third party

METHODS AND APPARATUSES FOR RESTFUL BATCH SERVICES

CROSS REFERENCE TO RELATED APPLICATIONS

This application is a § 371 application of International Application No. PCT/US2014/014642, filed Feb. 4, 2014, which claims the benefit of U.S. application Ser. No. 61/762,133, filed on Feb. 7, 2013 the entire contents of which are hereby incorporated by reference.

BACKGROUND

Machine to machine (M2M) communications refers to communication between two machines. With more and more data being collected automatically from sensors and with machines becoming more and more intelligent, M2M is becoming more important.

Machines may communicate with one another via wireless or wired systems. Often, a machine such as a sensor or meter captures an event which generates data such as a temperature or an inventory level. The data may be communicated through a network to an application.

Often, these M2M communications require many messages to perform the requested services.

SUMMARY

Apparatuses, computer readable media, and methods are disclosed for supporting services at an application service layer (ASL). The methods may include responding to receiving batched requests from an entity by processing the batched requests, and sending a response to the batched requests to the entity. The methods may include sending a separate response to each request indicated in the batched request to the entity, or sending a batched response. Two or more batched requests may have the same operation and the operation may be only specified once for the two or more batched requests. The operation may be determined based on a name of the batched requests or an attribute of the batched request. The request may be determined to be a batch request based on a name of the batched request, attributes associated with the batched request, or an address to which the batched request is addressed.

A computer system for supporting services is disclosed. The computer system may include an application service layer (ASL) configured to process batched requests received from an entity, and configured to send a response to the batched requests to the entity.

The ASL may be configured to send a separate response to each request indicated in the batched requests to the entity. The ASL may be configured to process each request indicated in the batched requests.

In some embodiments, two or more of the batched requests may indicate the same operation, but only specify the operation once for the two or more requests.

In some embodiments, two or more of the batched requests may be different operations.

The ASL may be a service capability layer (SCL). The SCL may be an European Telecommunications Standards Institute (ETSI) M2M SCL.

BRIEF DESCRIPTION OF THE DRAWINGS

A more detailed understanding may be had from the following description, given by way of example in conjunction with the accompanying drawings wherein.

DETAILED DESCRIPTION

Figure 1A:
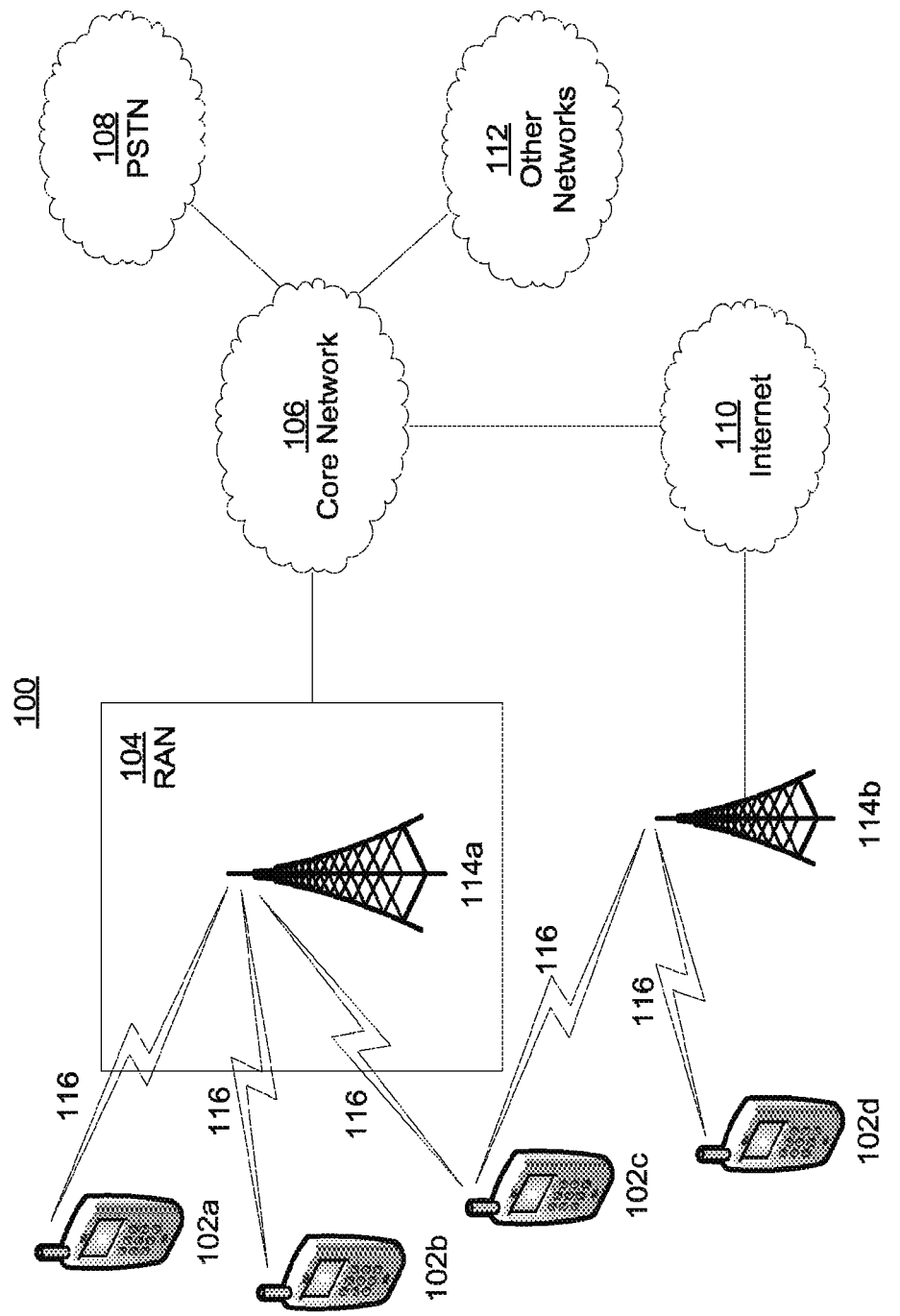
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
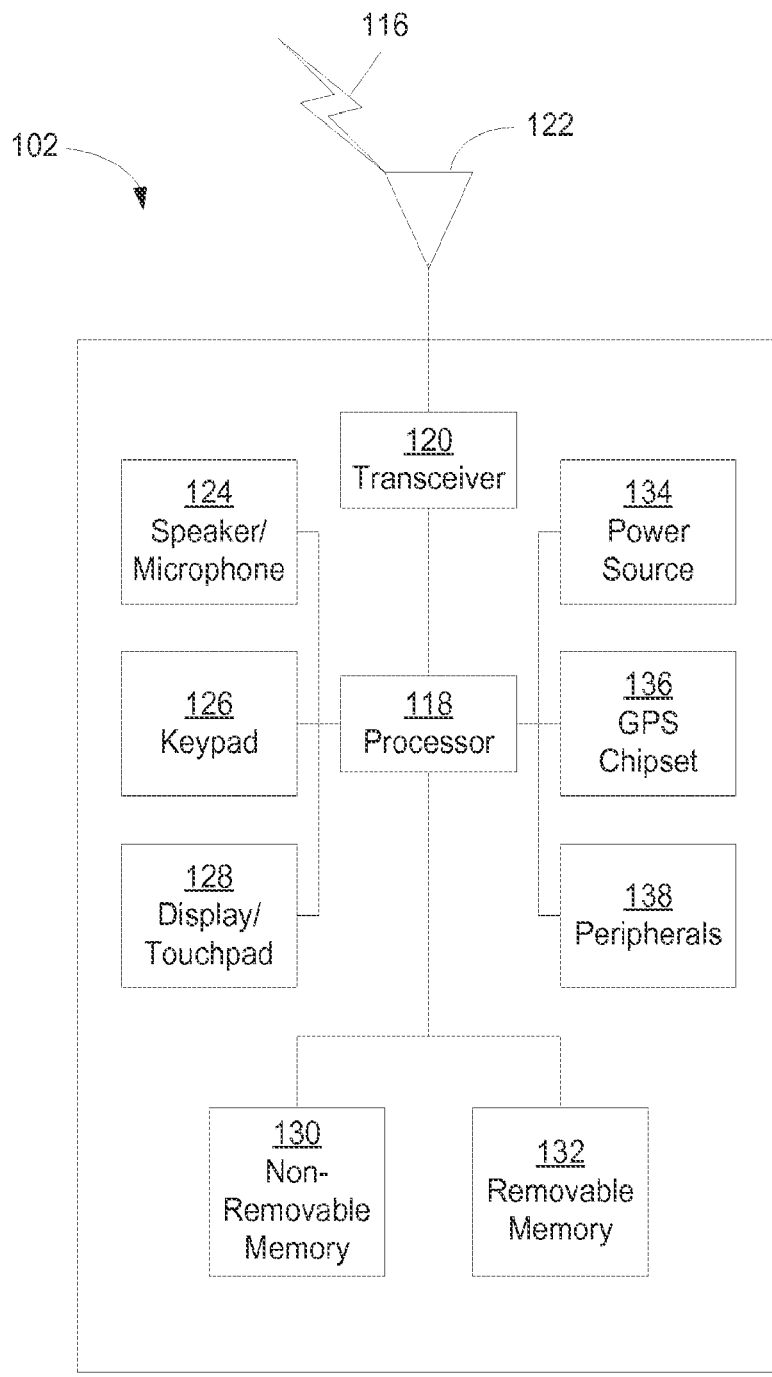
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
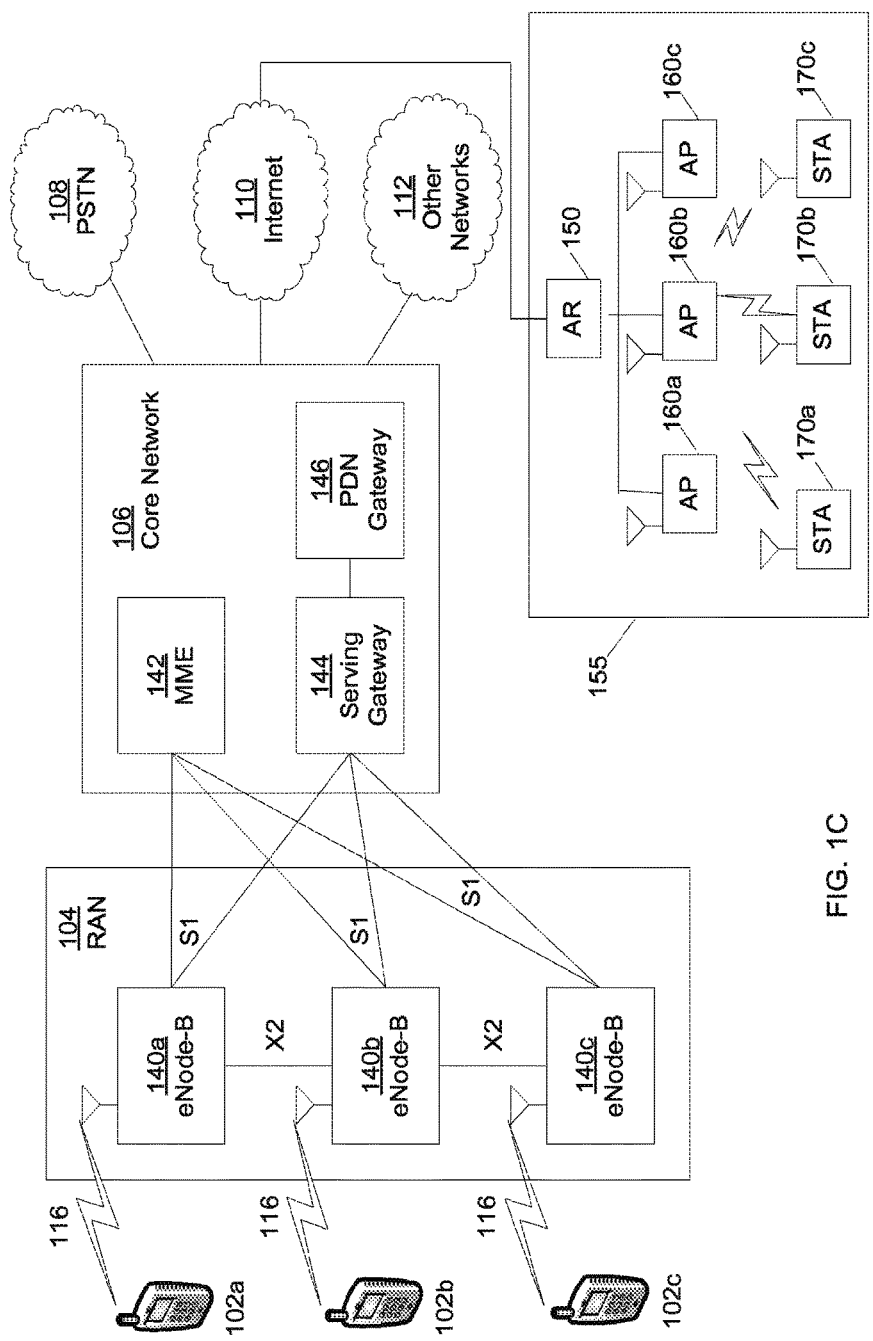
FIG. 1C is a system diagram of the RAN 104 and the core network 106 according to an embodiment.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c. A STA 170 may be a wireless device such as WTRU 102.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the other networks 112, which may include other wired or wireless networks that are owned and/or operated by other service providers.

In some embodiments, the WTRU 102 may be a device that generates data such as a water meter, inventor detector, door sense, temperature sensor, video camera, etc.

Figure 2:
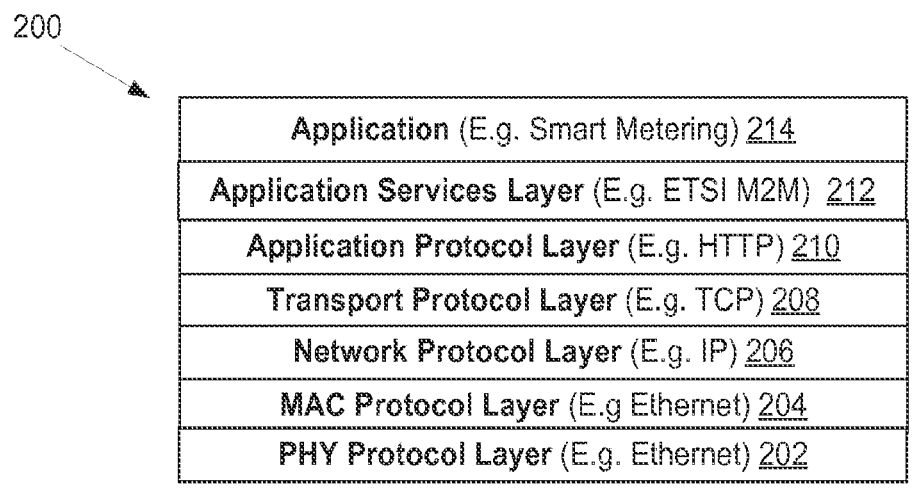
FIG. 2 illustrates a protocol stack including an application services layer (ASL), which may be a service capability layer (SCL)

FIG. 2 illustrates a protocol stack including an application services layer (ASL), which may be a service capability layer (SCL). Illustrated in FIG. 2 are a physical (PHY) protocol layer 202, a medium access control (MAC) protocol layer 204, a network protocol layer 206, a transport protocol layer 208, an application protocol layer 210, an SCL 212, and an application 214. An SCL 212 may provide a support layer for application 214 in which a collection of functions may be implemented in a re-usable and modular fashion. For example, an SCL 212 may support application programming interfaces (APIs) providing application 214 access to a collection or library of functions of an application protocol layer 210 as well as access to functions and services residing in lower protocol layers. An SCL 212 may, for example, provide services such as application bootstrapping, registration, discovery, management, and general transmission and reception of application messages, or the like. The services of the SCL 212 may be made available to application 214 via APIs which may use defined message formats, resource structures and resource representation.

Figure 3:
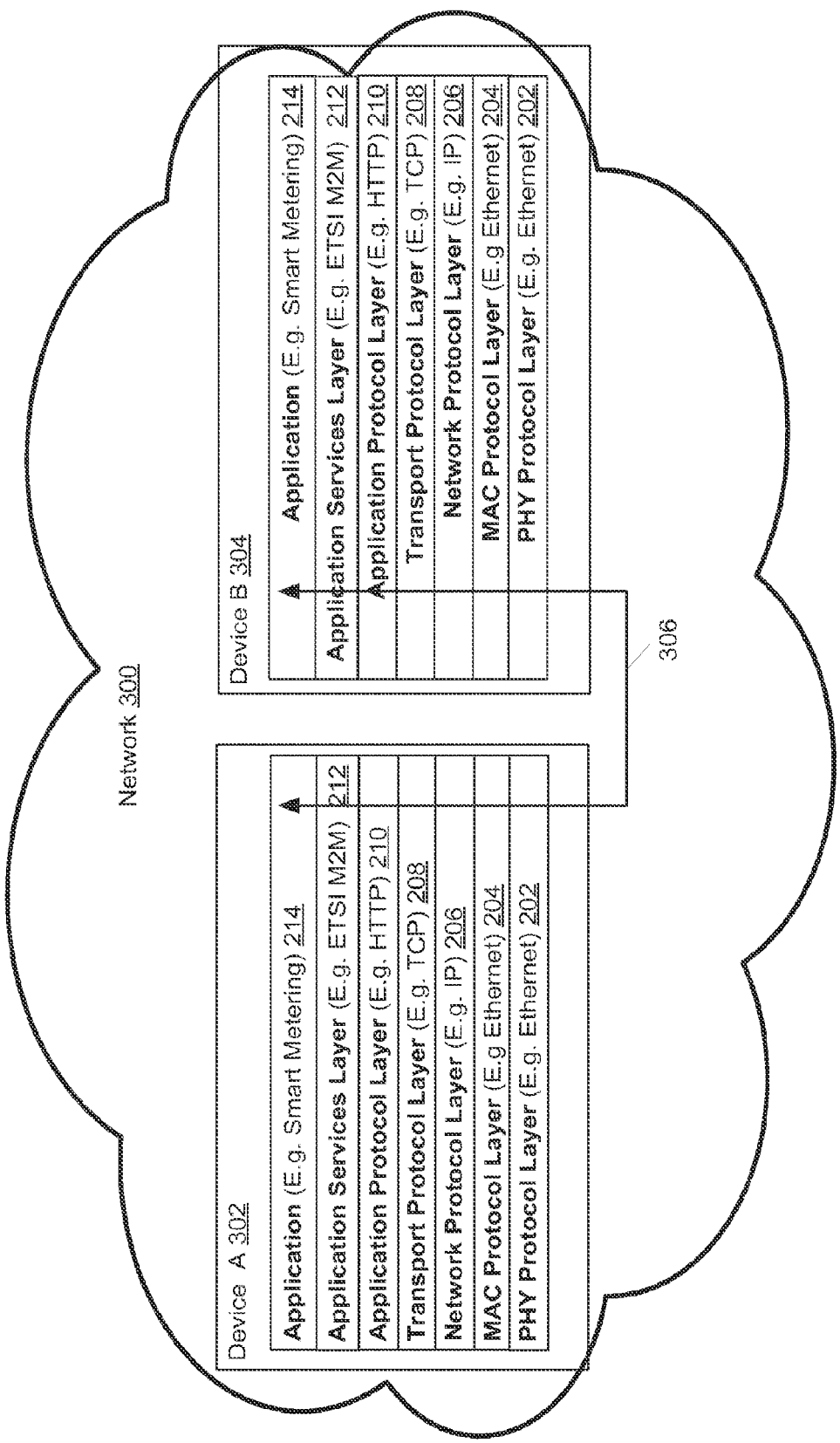
FIG. 3 illustrates an example where two applications communicate with one another via a common ASL, which may be a SCL.

FIG. 3 illustrates an example where two applications communicate with one another via a common ASL, which may be a SCL. Illustrated in FIG. 3 are network 300, device A 302, device B 304, and communications 306. Device A 302 and device B 304 may be wireless devices such as WTRUs 102, or devices that are wired directly to a communication network. Device A 302 and device B 304 may be termed machine to machine (M2M) devices 302, 304, as device A 302 and device B 304 are devices or machines that are communicating with one another. For example, device A 302 and device B 304 may be wired directly to the Internet 110 or other networks 112. Communication 306 may be a communication 306 between the application 214 of device A 302 and application 214 of Device B 304. The communication 306 illustrates application 214 of device A 302 and application 214 of device B 304 utilizing the ASL 212 to communicate with one another using protocols and services provided by the ASL 212.

Figure 4A:
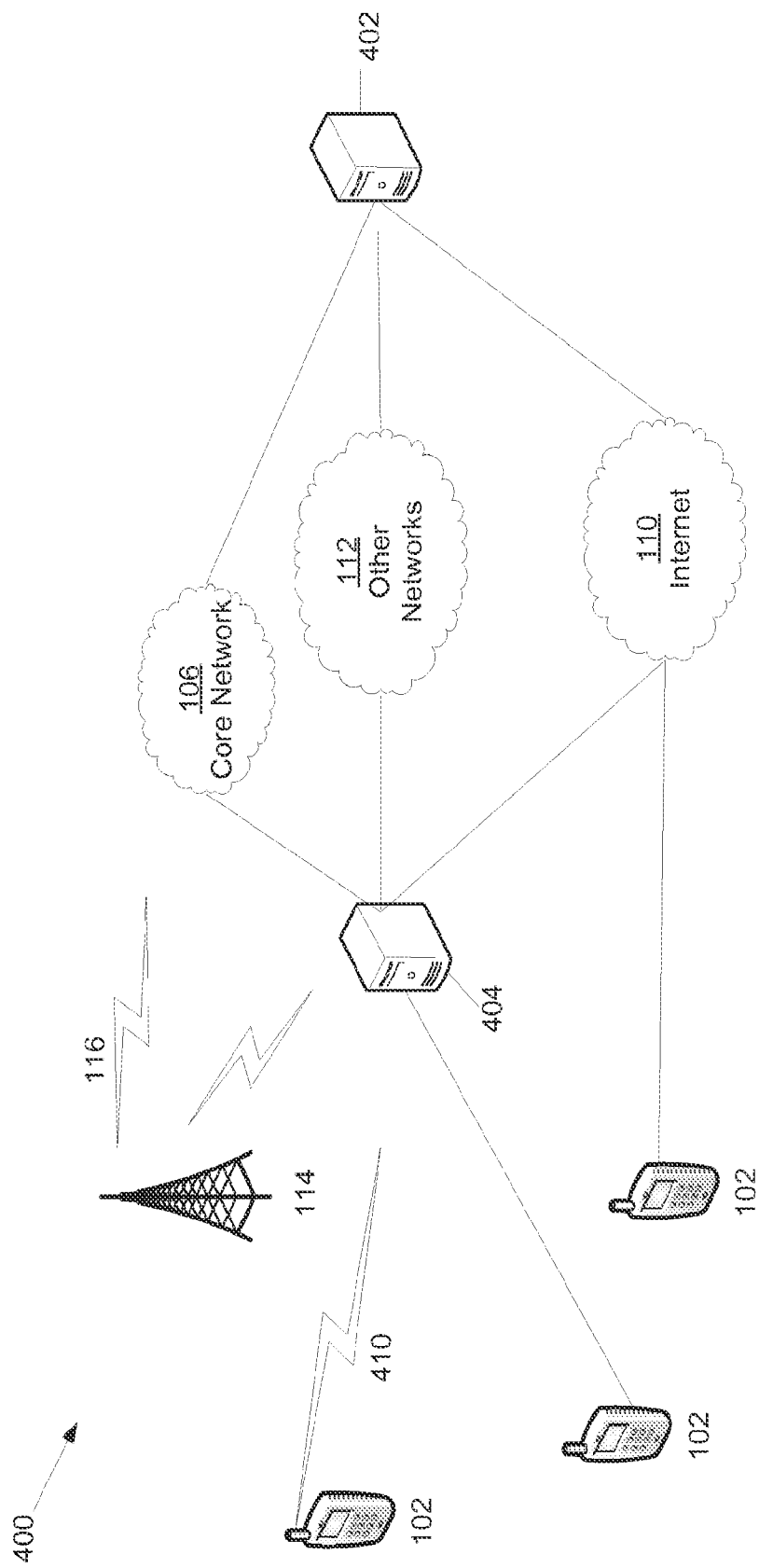
FIG. 4A illustrates an M2M system 400 according to some embodiments.

FIG. 4A illustrates an M2M system 400 according to some embodiments. European Telecommunications Standards Institute (ETSI) Machine-to-Machine (M2M) communications functional architecture defines a standardized application service layer (ASL) specifically tailored for enabling communication between M2M applications and M2M devices, gateways, and servers. FIG. 4A illustrates the overall M2M system 400 consisting of M2M server 402, M2M gateway 404, M2M devices 102, and M2M applications (not illustrated). In some embodiments, FIG. 4A may be an ETSI M2M system 400. In ETSI M2M terminology, the ASL may be referred to as the Service Capability Layer (SCL). M2M devices 102 may communicate with the server 402 via a WLAN 155, Bluetooth, 3GPP, etc. The M2M gateway 404 enables cellular and non-cellular M2M devices 102 to communication through operator networks, 106, 112, 110. The M2M server provides an application service layer 212, which may be a service capability layer.

In some embodiments, the system 400 may be a Representational State Transfer (RESTful) system 400. RESTful may be a software architecture that relies on a client-server based model. Clients make requests to resources which are hosted on servers. A resource may be addressed via a Uniform Resource Identifier (URI). Clients may use a simple and uniform set of commands to make requests to resources. These commands are often referred to as CRUD operations. The CRUD operations may include Create (POST), Retrieve (GET), Update (PUT) and Delete. Zigbee™ IP Smart Energy™ 2.0 SCL and ETSI M2M SCL may use a RESTful SCL.

Figure 4B:
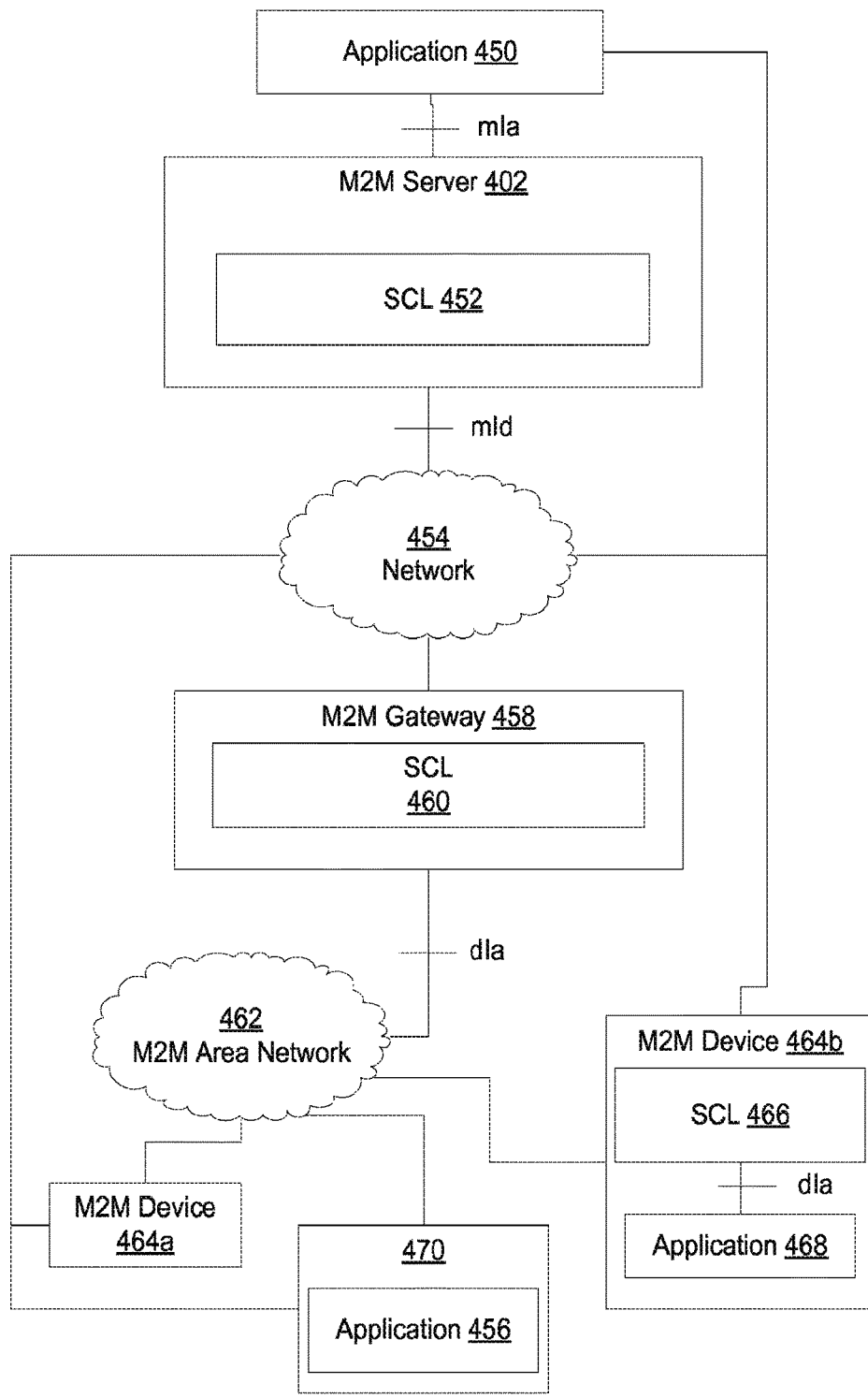
FIG. 4B illustrates an M2M architecture according to some embodiments.

FIG. 4B illustrates an M2M architecture according to some embodiments. Illustrated in FIG. 4B are an application 450, an M2M server 402, a network 454, an M2M gateway 458, an M2M area Network 462, an M2M device 464a, an application 456, an M2M device 464b, and interfaces dIa, mId, and mIa, where d stands for device, m stands for service, and a stands for application.

The M2M server 402 may include a service capabilities layer (SCL) 452. The M2M gateway 458 may include service capabilities layer (SCL) 460. The M2M device 464*b* may include application 468 and service capabilities layer (SCL) 466. In some embodiments, the M2M architecture may be an ETSI M2M architecture. In some embodiments, the SCL 452 can be hosted on a M2M Server 402, gateway 458, or device 464*b*. The SCL 452 may be an ASL.

Applications 468, 450, 456 may register and interface to one or more SCLs 460, 452, 466 hosted on the M2M servers 402, gateways 458, or M2M devices 464*b*. In some embodiments, the interfaces mIa, mId, dIa may be used. ETSI M2M may define the interfaces mIa, mId, dIa, which may include methods used by the SCLs 452, 460, 466 and the applications 456, 468, 450 to communicate with one another. An M2M device 464*a* may not have a SCL, in which case the M2M device 464*a* may communicate with a M2M gateway 458. In some embodiments, an application 450, 456, 468 may communicate with the M2M device 464*a* and a M2M gateway 458 to facilitate communications between the M2M device 464*a* and the M2M server 402. Application 456 may be hosted by a device 470.

The SCLs 460, 452, 466 may include a resource structure 900, 1000 as disclosed herein. One or more of the SCLs 460, 452, 466 may include only partial functional of an SCL. The M2M device 464*a* may be a non-ETSI M2M device. The M2M device 464*a* may include an SCL that is not compliant with one or more standards that the M2M gateway 458 and/or M2M server 402 is compliant with. The M2M devices 464*a*, 464*b* and application 454 may communicate with M2M area network 462 and/or with network 454 (not illustrated). There may be more than one of each of the elements illustrated in FIG. 4B.

Figure 5:
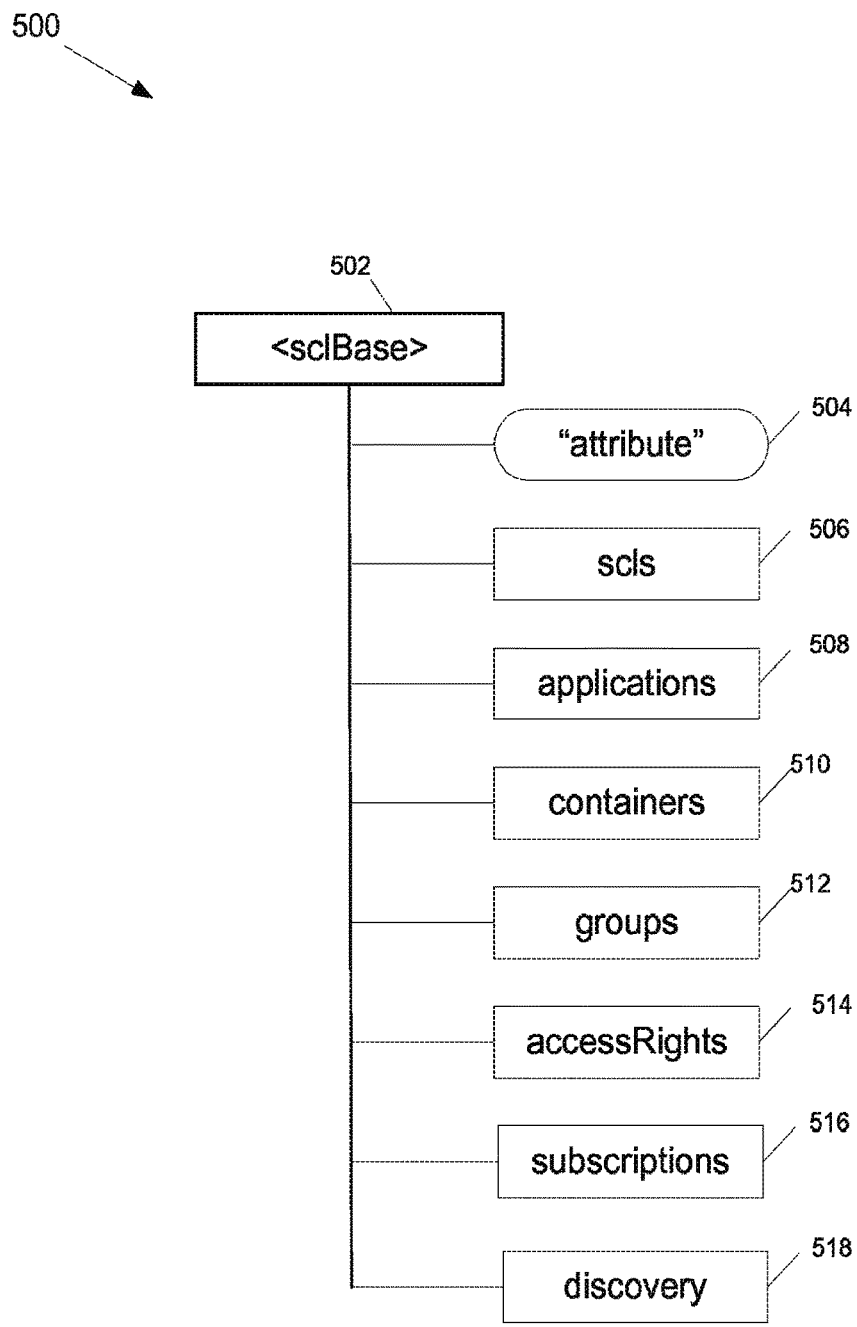
FIG. 5 illustrates an example of a resource structure. The resource structure may be a RESTful resource structure.

FIG. 5 illustrates an example of a resource structure 500. The resource structure 500 may be a RESTful resource structure.

The resource structure 500 may include sclBase 502, which may include one or more of the following group of resources: attribute 504, scls 506, applications 508, containers 510, groups 512, accessRights 514, subscriptions 516, and discovery 518. In some embodiments, attribute 504, scls 506, applications 508, containers 510, groups 512, accessRights 514, subscriptions 516, and discovery 518 may be as disclosed in ETSI M2M. The SCL 452 (FIG. 4B) may include a resource structure 500.

An application 450, 456, 468 and/or another SCL (not illustrated in FIG. 4B) may be configured to use services provided by SCL 452. The application 450, 456, 468 and/or another SCL (not illustrated) may interact with resources within resource structure 500 using RESTful CRUD operations (Create, Retrieve, Update, Delete).

RESTful CRUD operations may be configured as disclosed in the ETSI M2M architecture. RESTful CRUD operation may be configured to use primitives (not illustrated). For example, the primitive may be RESTful messages (not illustrated). The primitive may provide a standard way in which operations are performed on specific resources hosted within the RESTful resource structure 500. In some embodiments, the primitives support performing a single RESTful CRUD operation on a single resource with SCL RESTfulresource structure 500.

Figure 6:
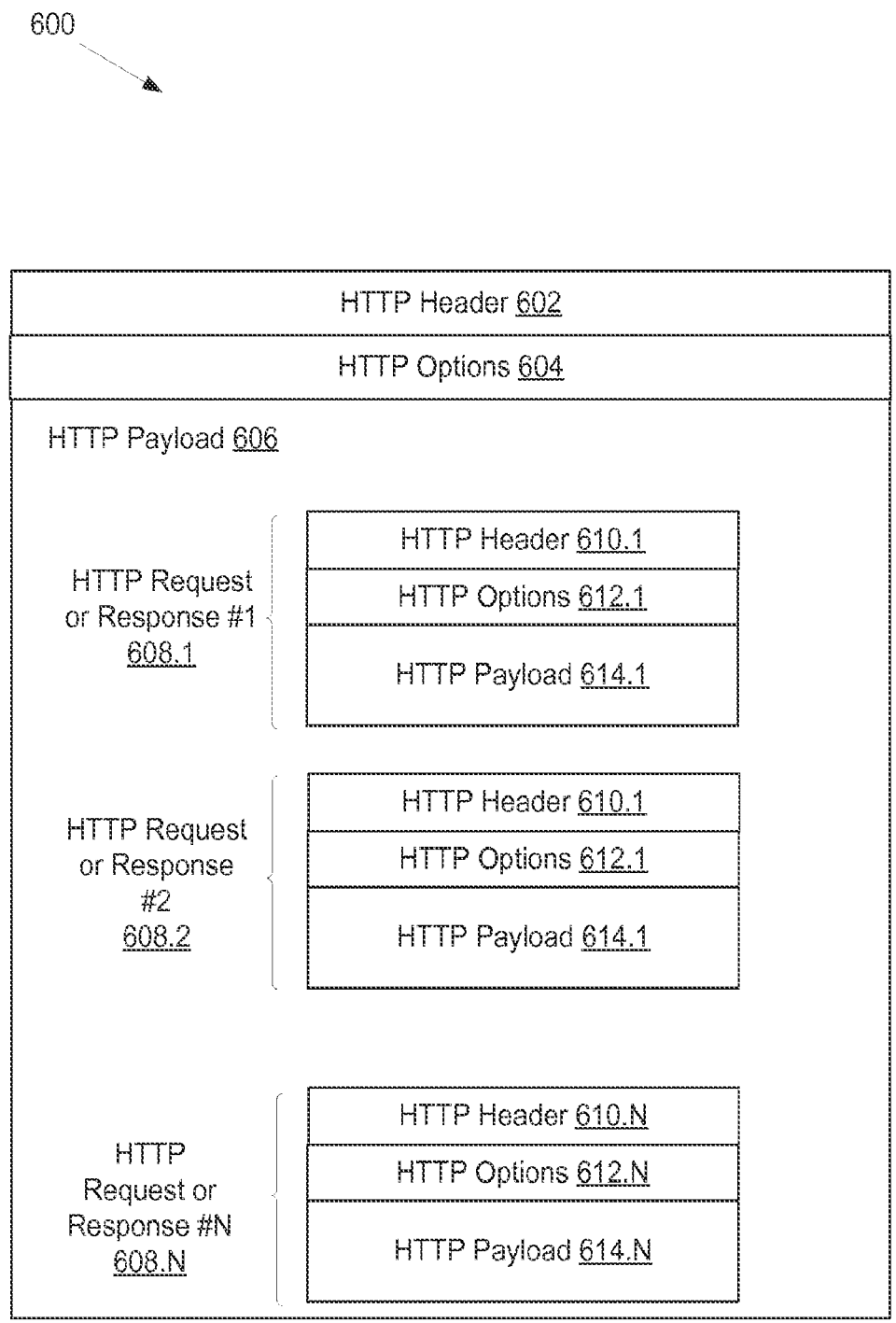
FIG. 6 illustrates an example of a HTTP batched request or response.

FIG. 6 illustrates an example of a HTTP batched request or response 600. The HTTP batched request or response 600 may include an HTTP header 602, HTTP options 604, and an HTTP payload 606. The HTTP payload 606 may include one or more HTTP request or responses 608. Each HTTP request or response 608 may include an HTTP header 610.1, HTTP options 612.1, and an HTTP payload 614.1. The HTTP batched request or response 600 may be parsed and each of the HTTP request or response 608 in the HTTP payload 606 may be extracted and processed as separately. In some embodiments, each of the HTTP request or response 608 is a complete HTTP request or response.

Figure 7:
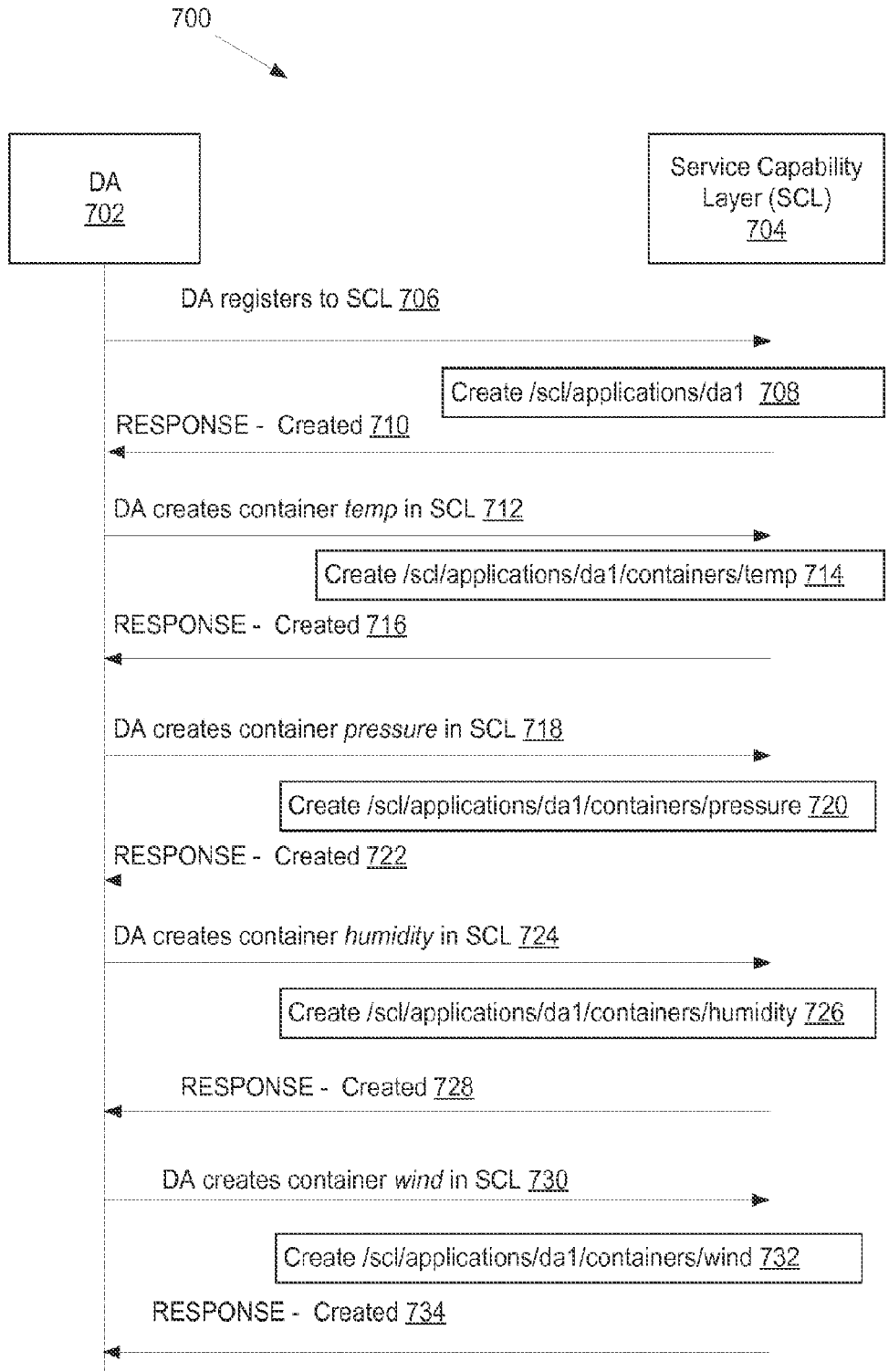
FIG. 7 illustrates an example of a method of a device application registering to a service capability layer and creating four container resources.

FIG. 7 illustrates an example of a method 700 of a device application registering to a service capability layer and creating four container resources.

The DA 702 may be an application of a device. For example, the DA 702 may be the application 468 (see FIG. 4B). The device may be a device 464*b*. The device 464*b* may be a sensor that supports 4 sensors such as temperature, pressure, humidity, and wind. These sensors may take periodic measurements and make them available via the network interface (not illustrated) of the device 464*b*. The device 464*b* may have a limited amount of local memory preventing it from storing a history of the individual sensor readings.

The service capability layer (SCL) 704 may be the SCL 452 (see FIG. 4B). The method 700 may begin with DA 702 registers to SCL 706. The DA 702 may register to the SCL 704. The method 700 may continue with creating /scl/applications/da1 708. The SCL 704 may create an application resource for the DA 702. For example, the SCL 704 may create an application resource "da1" for DA 702 in a resource structure 500 (FIG. 5) under applications 508. The method 700 may continue with response-created 710. The SCL 704 may send a response to the DA 702 that the application resource was created.

The method 700 may continue with DA creating container temp in SCL 712. For example, the application 468 may send a create to SCL 452. The method 700 may continue with creating /scl/applications/da1/containers/temp 714. For example, the SCL 452 may create the resource "temp" under the "containers" 510 resource. The method 700 may continue with response-created 716. For example, the SCL 452 may send a response to the application 468 that "temp" container was created.

The method 700 may continue with DA creating container pressure in SCL 718. For example, the application 468 may send a create to SCL 452. The method 700 may continue with creating /scl/applications/da1/containers/pressure 720. For example, the SCL 452 may create the resource "pressure" under the "containers" 510 resource. The method 700 may continue with response-created 722. For example, the SCL 452 may send a response to the application 468 that "pressure" container was created.

The method 700 may continue with the DA 702 creating container humidity in SCL 724. For example, the application 468 may send a create to SCL 452. The method 700 may continue with create /scl/applications/da1/containers/humidity 726. For example, the SCL 452 may create the resource "humidity" under the "containers" 510 resource. The method 700 may continue with response-created 728. For example, the SCL 452 may send a response to the application 468 that "humidity" container was created.

The method 700 may continue with the DA creating container wind in SCL 730. For example, the application 468 may send a create to SCL 452. The method 700 may continue with creating /scl/applications/da1/containers/wind 732. For example, the SCL 452 may create the resource "temp" under the "containers" 510 resource. The method 700 may continue with response-created 734. For example, the SCL 452 may send a response to the application 468 that "temp" container was created.

The application 702 may now send data to the created temperate container, pressure container, humidity container, and wind container. In some embodiments, the method 700 may be according to ETSI M2M.

Figure 8:
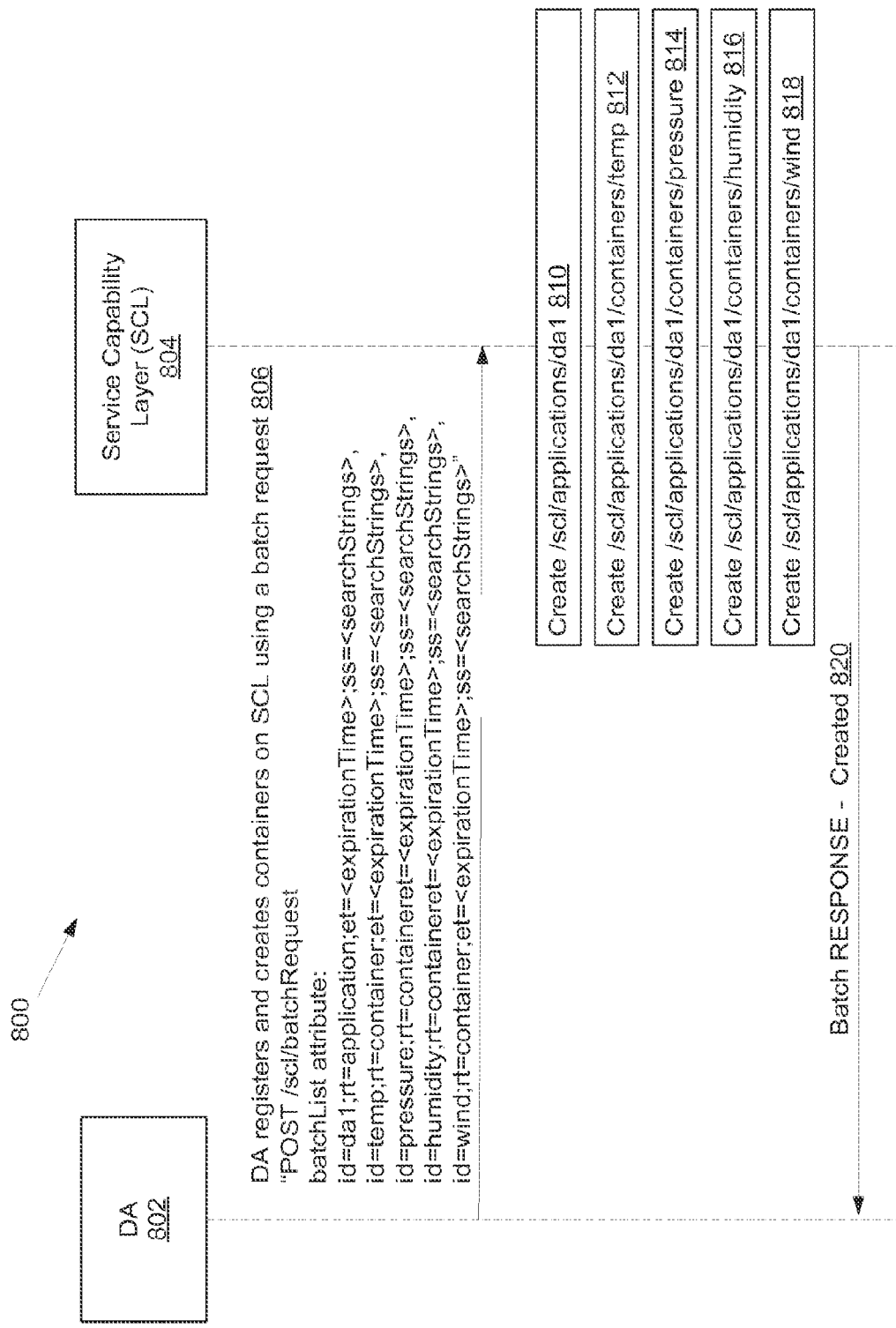
FIG. 8 illustrates an example of a method of a device application registering to a service capability layer and creating four container resources.

FIG. 8 illustrates an example of a method 800 of a device application registering to a service capability layer and creating four container resources.

The DA 802 may be an application of a device. For example, the DA 802 may be the application 468 (see FIG. 4B). The device may be a device 464b. The device 464b may be a sensor that takes supports 4 sensors such as temperature, pressure, humidity, and wind. These sensors may take periodic measurements and make them available via the network interface (not illustrated) of the device 464b. The device 464b may have a limited amount of local memory preventing it from storing a history of the individual sensor readings. The service capability layer (SCL) 804 may be the SCL 452 (see FIG. 4B).

The method 800 may begin with the DA 802 registering and creating containers on SCL using a batch request 806. For example, the application 468 may send the batchRequest illustrated in Table 1 to the SCL 452.

TABLE 1

DA Registers and Creates Containers

| Name | Description |
|---|---|
| batchRequest | POST /scl/batchRequest batchList attribute:<br>id=da1;rt=application;et=<expirationTime>;<br>ss=<searchStrings>,<br>id=temp;rt=container;et=<expirationTime>;<br>ss=<searchStrings>,<br>id=pressure;rt=containeret=<expirationTime>;<br>ss=<searchStrings>,<br>id=humidity;rt=containeret=<expirationTime;<br>ss=<searchStrings>,<br>id=wind;rt=container;et=<expirationTime>;<br>ss=<searchStrings>". |

The method 800 may continue with creating /scl/applications/da1 810. The SCL 704 may create an application resource for the DA 702. For example, the SCL 804 may create an application resource "da1" for DA 802 in a resource structure 500 (FIG. 5) under applications 508.

The method 800 may continue with creating /scl/applications/da1/containers/temp 812. For example, the SCL 452 may create the resource "temp" under the "containers" 510 resource. The method 800 may continue with creating /scl/applications/da1/containers/pressure 814. For example, the SCL 452 may create the resource "pressure" under the "containers" 510 resource. The method 800 may continue with creating /scl/applications/da1/containers/humidity 816. For example, the SCL 452 may create the resource "humidity" under the "containers" 510 resource. The method 800 may continue with creating /scl/applications/da1/containers/wind 818. For example, the SCL 452 may create the resource "wind" under the "containers" 510 resource.

The method 800 may continue with Batch RESPONSE-Created 820. For example, the SCL 452 may send Batch Response-Created to the application 468.

It should be understood by those of skill in the art that the method 800 may have fewer messages between the DA 802 and the SCL 804 than the method 700 of FIG. 7.

Figure 9:
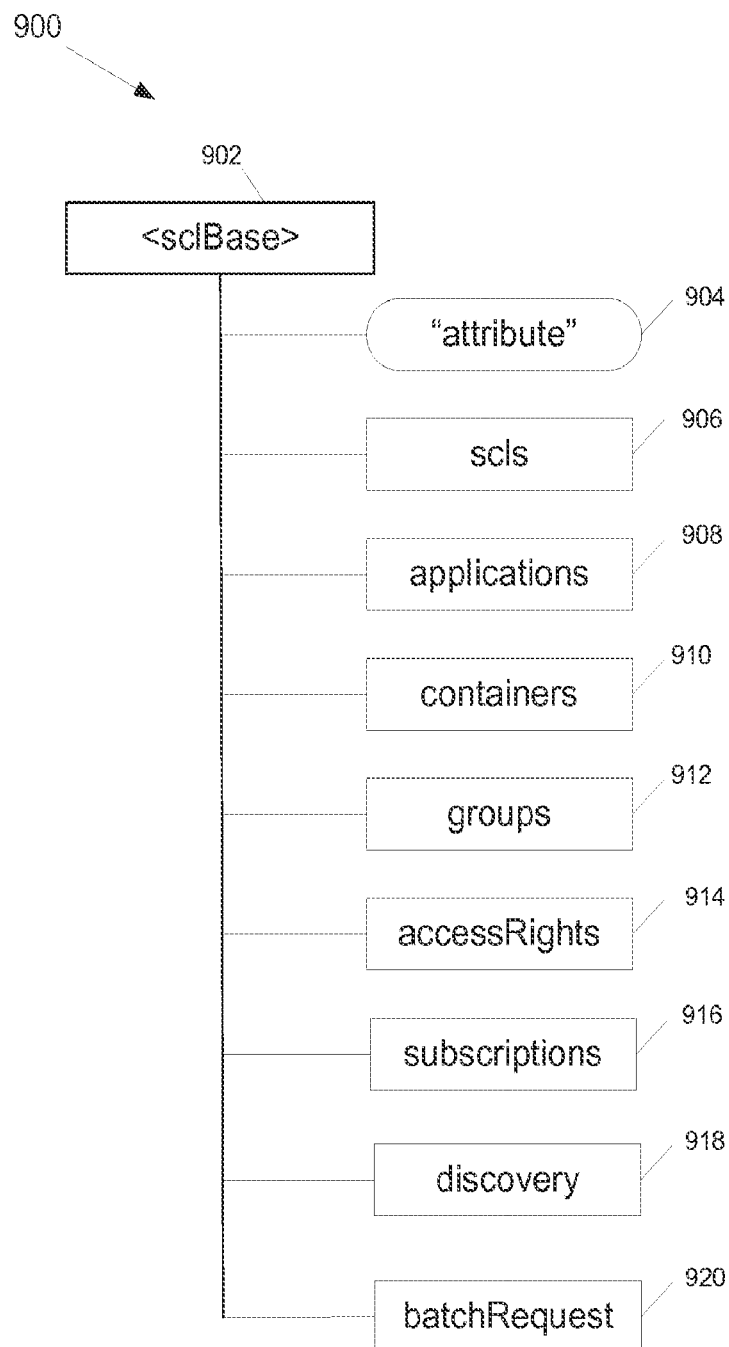
FIG. 9 illustrates an example of a resource structure with a batch request resource according to some embodiments.

FIG. 9 illustrates an example of a resource structure 900 with a batch request resource according to some embodiments. The resource structure 900 may be a RESTful resource structure.

The resource structure 900 may include sclBase 902, which may include one or more of the following group of resources: attribute 904, scls 906, applications 908, containers 910, groups 912, accessRights 914, subscriptions 916, discovery 918, and batchRequest 920. In some embodiments, attribute 904, scls 906, applications 908, containers 910, groups 912, accessRights 914, subscriptions 916, and discovery 918 may be as disclosed in ETSI M2M. The SCL 452 (FIG. 4B) may include a resource structure 500.

An application 450, 456, 468 and/or another SCL (not illustrated in FIG. 4B) may be configured to use services provided by SCL 452. The application 450, 456, 468 and/or another SCL (not illustrated) may interact with resources within resource structure 500 using RESTful CRUD operations (Create, Retrieve, Update, Delete).

The batchRequest 920 may be a resource that can be targeted by an application or another SCL for the SCL to service batched requests. The batchRequest 920 may be a virtual resource. The batchRequest 920 may be a virtual resource defined in an ETSI M2M SCL resource structure. In some embodiments, the batchRequest 920 may be a resource that does not support or maintain any addressable sub-resources or attributes. The batchRequest 920 resource may provide a single addressable location in the SCL resource structure 900 which batched requests can be targeted towards from applications or other SCLs.

An SCL may be configured to respond to receiving a request targeting the batchRequest 920 resource. The SCL may then differentiate the request from other non-batch requests it receives and handle it as a batched request. In some embodiments, the batchRequest 920 may be virtual and RESTful so it may not include a state (e.g. resource attributes). In some embodiments, multiple and simultaneous requests may be made to the batchRequest 920 resource. In some embodiments, the requests to the batchRequest 920 may be made in an idempotent and non-conflicting manner. In some embodiments, the batchRequest 920 may reside at the root level of the resource structure 900. By residing at the root level of the resource structure 900, the batchRequest 920 may be in a standardized location which may be determined by applications and other SCL.

In some embodiments, the batchRequest 920 resource may reside at a different location of the resource structure 900. In some embodiments, there may be more than one batchRequest 920 resources, and the different batchRequest 920 resources may reside in different locations of the resource structure 900. For example, the batchRequest 920 resource may be included in the resource structure 900 only with resources that support batched requests.

Figure 10:
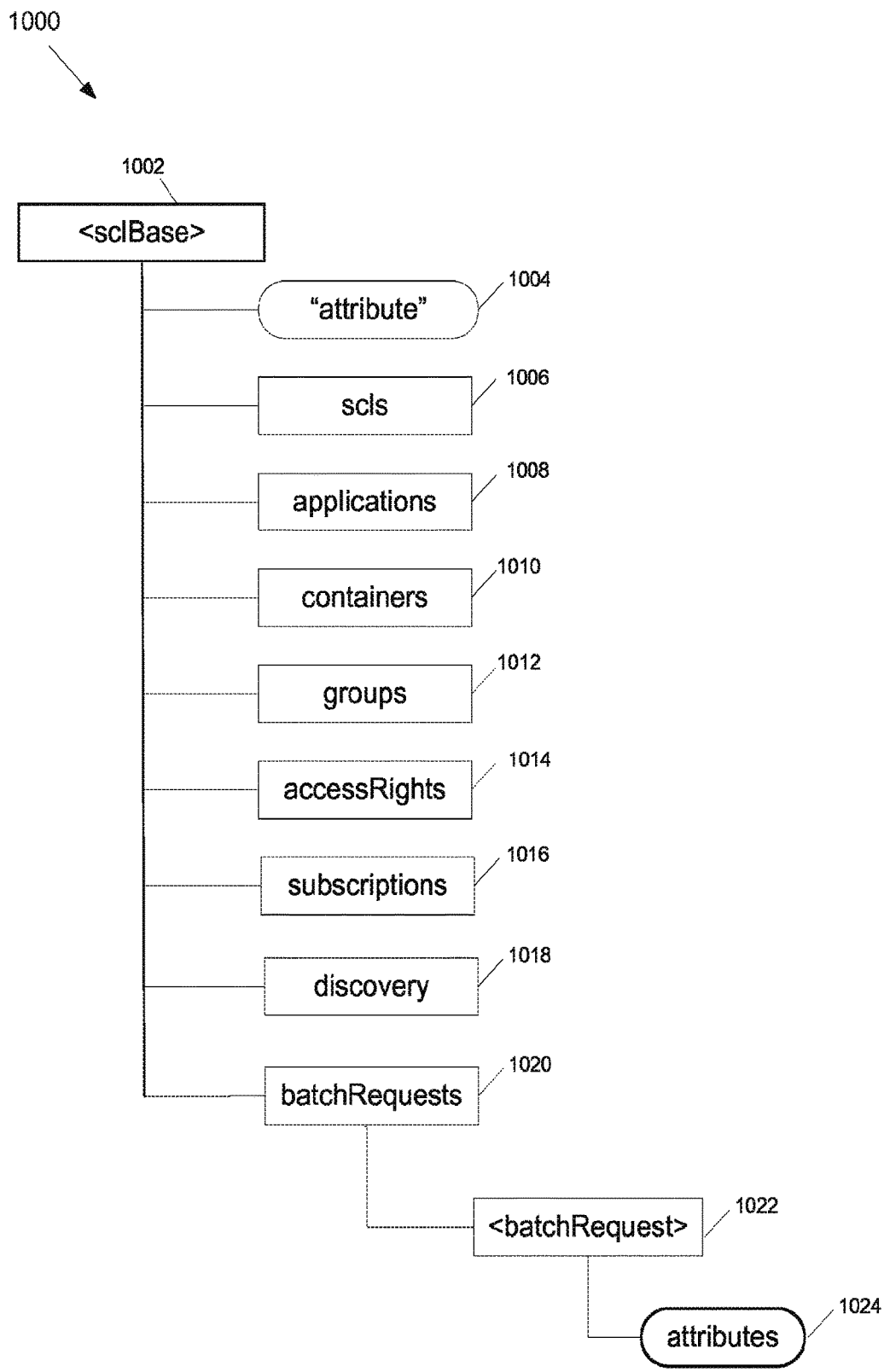
FIG. 10 illustrates an example of a resource structure with a batch request resource according to some embodiments.

FIG. 10 illustrates an example of a resource structure 1000 with a batch request resource according to some embodiments. The resource structure 1000 may be a RESTful resource structure. Resource structure 1000 may be an ETSI M2M resource structure.

The resource structure 1000 may include sclBase 1002, which may include one or more of the following group of resources: attribute 1004, scls 1006, applications 1008, containers 1010, groups 1012, accessRights 1014, subscriptions 1016, discovery 1018, and batchRequests 1020. In some embodiments, attribute 1004, scls 1006, applications 1008, containers 910, groups 912, accessRights 914, subscriptions 916, and discovery 918 may be as disclosed in ETSI M2M. The SCL 452 (FIG. 4B) may include a resource structure 500.

An application 450, 456, 468 and/or another SCL (not illustrated in FIG. 4B) may be configured to use services provided by SCL 452. The application 450, 456, 468 and/or another SCL (not illustrated) may interact with resources within resource structure 500 using RESTful CRUD operations (Create, Retrieve, Update, Delete).

BatchRequests 1020 may be a collection. BatchRequests 1020 may include one or more instances of a <batchRequest> 1022 resource. Each of the <batchRequest> 1022 may have one or more attributes 1024. The <batchRequest> 1022 may include sub-resources that are used to support initiating and servicing of a batched request by the SCL. The batchRequest 1020 may not be a virtual resource and may be addressed.

In some embodiments, to initiate a batched request, a request can be made to create or update a <batchRequest> 1022 resource within the batchRequests 1020 collection. The act of creating or updating the <batchRequest> 1022 resource may trigger the SCL to start servicing the batched request.

In some embodiments, the <batchRequest> 1022 resource may support a specific attribute 1024 for triggering the corresponding SCL to start processing the <batchRequest> 1022 resource. For example, an attribute 1024 called execute can be defined. The <batchRequest> 1022 resource may be maintained in the batchRequests 1020 collection and re-used or re-invoked to perform subsequent batched requests. For example, the same originating requester or a different requester may invoke the same <batchRequest> 1022. In some embodiments, an application may update a <batchRequest> 1022 resource and then trigger the SCL to start servicing the corresponding batch requests associated with the updated <batchRequest> resource 1022. In some embodiments, the SCL may support value-added parameters or attributes to allow a requester to configure its preferences for how the SCL should service the <batchRequests> 1022. For example, the requester may specify a priority for each request or maximum delay for servicing each request for servicing a <batchRequest> 1022.

The attributes 1024 and sub-resources of a <batchRequest> 1022 resource may be used by an SCL for response handling. For example, responses or even links to responses may be stored as resources in the attributes 1024 and/or sub-resources of the <batchRequest> 1022. These responses may be accessible to the requester and may be cached and re-used by the SCL. For example, the cached responses may be used by an SCL to service future requests either from the same requester or by a different requester. A requester may queue up a set of <batchedRequests> 1022 in the SCL. The SCL may service the <batchRequests> 1020 and store the responses in the SCL resource structure 1000. The requester may retrieve the results after they generated by the SCL. In some embodiments, responses may be stored in other resources in the resource structure 1000 or another resource structure.

In some embodiments, the SCL may be configured by the requester to notify the requester when all the batched requests have completed. The requester may configure the SCL via a subscription/notification functionality. The responses may be included in the notification or stored in the resource structure 1000 for the requester to retrieve.

In some embodiments, a requester may configure the SCL for preferences for how the SCL handles responses. For example, the requester may configure the SCL for a desired number of individual responses to a <batchRequest> 1022, a maximum size of each individual response, or a maximum delay for a response relative to the time the <batchRequest> 1022 was initiated. In some embodiments, the SCL may have a default configuration for the preferences.

In some embodiments, the <batchRequests> 1020 collection may reside at the root level of the resource structure 1000. In some embodiments, the <batchRequests> 1020 may reside at the root level of an ETSI M2M resource structure 1000 under the <sclBase> 1002 resource. A <batchRequests> 1020 collection residing at the root level may provide a location that can be used by all SCL aware requesters. In some embodiments, one or more <batchRequests> 1020 collections may be located at other locations in the resource structure 1002. For example, the <batchRequest> 1020 may be located at <sclBase>/applications/<application>/batchRequests in an ETSI M2M resource structure 1000. Resource in the resource structure 1000 may have access rights associated with the resource. By putting a <batchRequest> 1020 under a resource in the resource structure 1000 only requesters that have the access rights to the resource may be able to access the <batchRequest> 1020 included under the resource.

Table 2 illustrates an example batchRequest being typed as a sub-resource. For example, the <batchRequest> 1022 of FIG. 10 may have a type of sub-resource.

TABLE 2

BatchRequests Collection Sub-Resource

| Name | Type | Description |
| --- | --- | --- |
| batchRequest | Sub-Resource | batchRequest resource instance |

Table 3 illustrates example attributes for a batchRequest resource. For example, <batchRequest> 1022 of FIG. 10 may have one or more of the attributes in Table 3.

TABLE 3

BatchRequest Resource Attributes

| Name | Type | Description |
| --- | --- | --- |
| Method | Attribute | CRUD operation to be performed on each of the individual requests contained in the batchList attribute. Note this attribute is optional since alternatively the method for each individual request may be included in the batchList if desired (see section 1.3) |
| batchList | Attribute | List of batched requests. See section 1.3. |
| batchResponse | Attribute | List of responses to batched requests. May consist of actual resource representations or may be list of links (e.g. URIs) to resources that contain response representations (e.g. containers or contentInstances). See section 1.2.2. Note this attribute is optional since alternatively the response may be included in the response primitive (e.g. in the header or payload of the primitive) and not stored in the batchRequest resource. |
| RequestDelay | Attribute | Used to specify the min, max or preferred delay used when processing each of the requests. Note this attribute is optional since alternatively the delay for each individual request may be included in the batchList if desired (see section 1.3) |
| ResponseDelay | Attribute | Used to specify the min, max or preferred delay used when processing each of the responses. Note this |

TABLE 3-continued

BatchRequest Resource Attributes

| Name | Type | Description |
|---|---|---|
| | | attribute is optional since alternatively the delay for each individual response may be included in the batchList if desired (see section 1.3) |
| ResponseSize | Attribute | May be used to specify the min, max or preferred size of batched response. Note this attribute is optional since alternatively the preferred size for each individual response may be included in the batchList if desired (see section 1.3) |
| enableBatchResponses | Attribute | Used to enable batched responses |

Figure 11A:
FIGS. 11A, 11B, and 11C illustrate different embodiments for batch primitives.
Figure 11B:
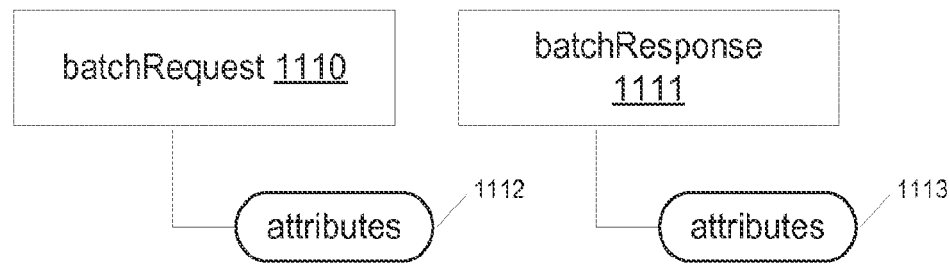
Figure 11C:
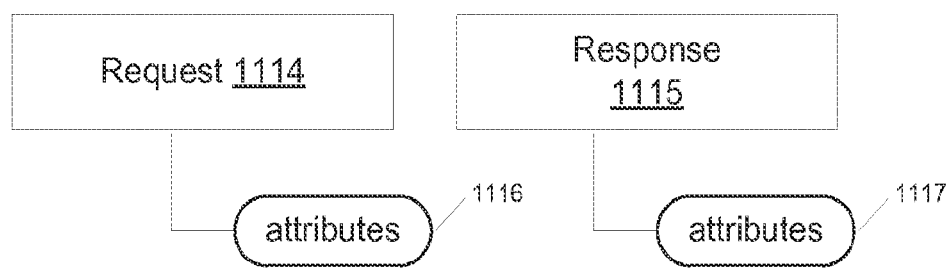

FIGS. 11A, 11B, and 11C illustrates different embodiments for batch primitives.

The different embodiments for batch primitives may be primitives for messages to support batch operations. The different embodiments for batch primitives may be SCL primitives for message to support performing RESTful CRUD operations batched together into a single request primitive.

FIG. 11A illustrates an embodiment for batch primitives where each primitive may a corresponding request and response. Illustrated in FIG. 11A are batchCreateRequest 1102, batchCreateResponse 1103, batchDeleteRequest 1104, batchDeleteResponse 1105, batchRetrieveRequest 1106, batchRetrieveResponse 1107, batchUpdateRequest 1108, and batchUpdateResponse 1109.

FIG. 11B illustrates an embodiment for batch primitives where a single batch request and a single batch response may be used. Illustrated in FIG. 11B are batchRequest 1110 and batchResponse 1111. Attributes 1112 may be associated with batchRequest 1110. Attributes 1113 may be associated with batchResponse 1111. Attributes 1112 and attributes 1113 may indicate an operation to perform on the batched requests and responses indicated in batchRequest 1110 and batchResponse 1111 respectively. The operation may be a CRUD operation.

FIG. 11C illustrates an embodiments for batch primitives where attributes are used to support batch processing.

Illustrated in FIG. 11C are request 1114, response 1115, attributes 1116, and attributes 1117. The attributes 1116 and attributes 1117 may be attributes for supporting request 1114 for batch processing and response 1115 for batch processing. The attributes 1116 and attributes 1117 may include attributes from Table 2 above and other attributes to support batch processing.

Using the proposed primitives support for performing a RESTful operation on multiple resources (using a single instance of a primitive) can be realized.

Using one of the embodiments disclosed in FIG. 11A, 11B, or 11C a requester may use a batch request primitive to batch together multiple requests to a SCL. Using one of the embodiments disclosed in FIG. 11A, 11B, or 11C a SCL may use the batch response primitives to batch together multiple responses to return to a requester in response to one or more requests. The requests and responses may be M2M RESTful operations.

Figure 12:
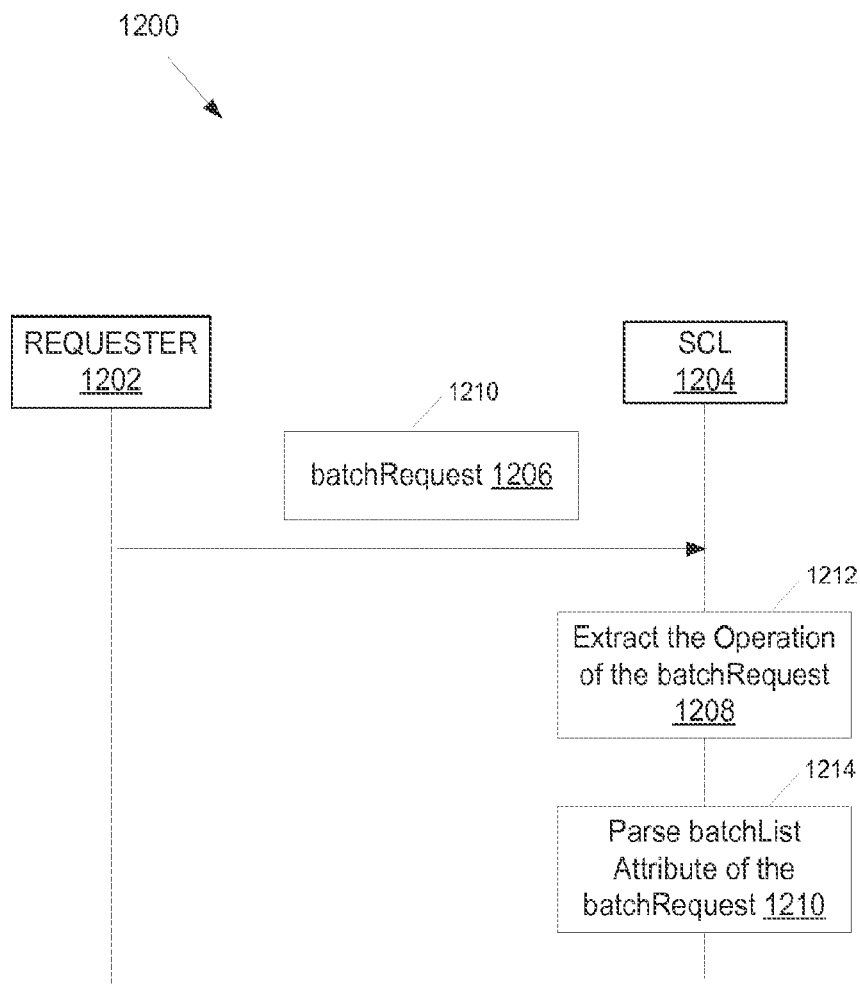
FIG. 12 illustrates a method for batch request primitive handling for a batch request sent to a batch request resource.

FIG. 12 illustrates a method 1200 for batch request primitive handling for a batch request sent to a batch request resource.

Illustrated in FIG. 12 is a requester 1202 and SCL 1204. The method 1200 may begin with the requester 1202 sending a batchRequest 1206 to the SCL 1204 at 1210. The batchRequest may identify a batchRequest resource. For example, the requester 1202 may be an application 450, 456, 468 (FIG. 4) or another SCL (not illustrated). The identified batchRequest resource may be a batchRequest resource 920 (FIG. 9) or batchRequest resource 1022 (FIG. 10).

The method 1200 may continue with extracting the operation of the batchRequest 1208 at 1212. Upon receiving the batchRequest 1206, the SCL 1204 may detect it as a batched request since it targets a batchRequest resource. The SCL 1204 may determine the operation of the batchRequest 1206. The operation may be a CRUD operation.

In some embodiments, the SCL 1204 may determine the operation of the batchRequest 1206 by using the primitive name of the batchRequest 1206. For example, the primitive name of the batchRequest 1206 may be one of the four primitive names as disclosed in FIG. 11A. In another example, an attribute associated with the batchRequest 1206 may be used to determine the operation for the batchRequest 1206. For example, the method primitive attribute may be used for a batchRequest 1110 of FIG. 11B. For example, the attribute 1112 of batchRequest 1110 may be the method primitive attribute as discussed below in Table 4.

The method 1200 may continue with parsing the batchList attribute 1210. The SCL 1204 may extract information for each of the individual requests batched together. The SCL 1204 may perform the corresponding operation on the resources targeted by each of the requests (not illustrated).

Figure 13A:
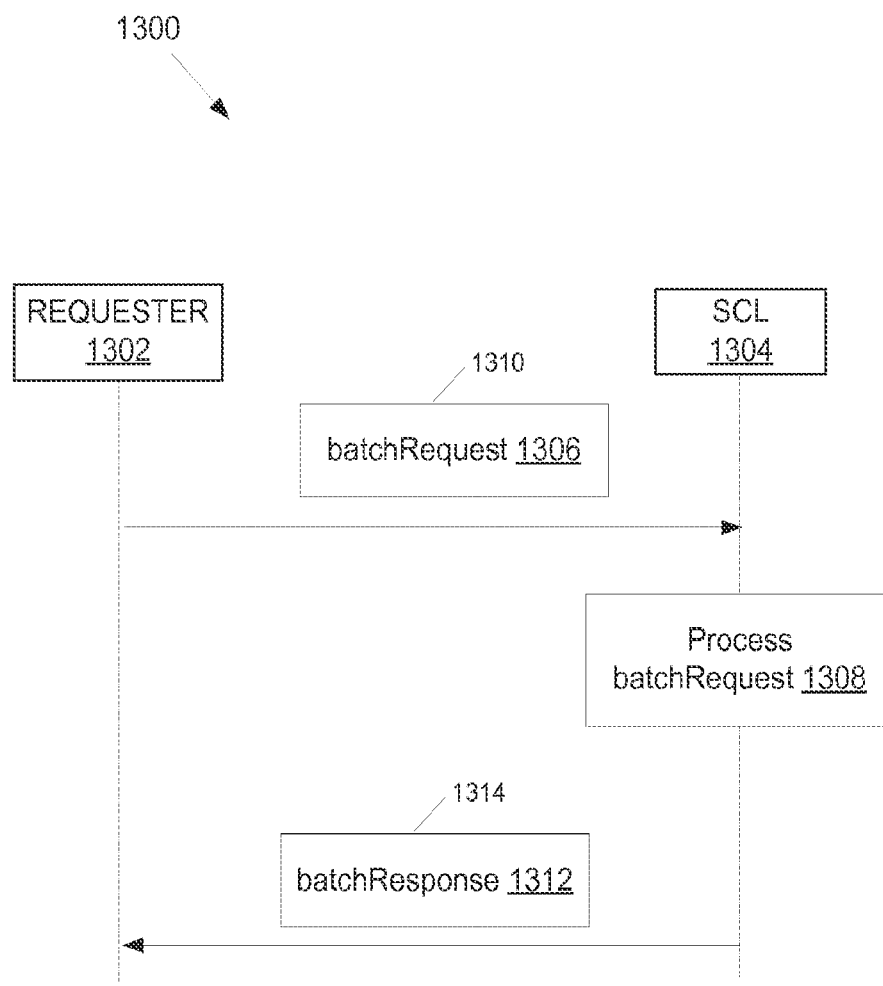
FIGS. 13A and 13B illustrate batch response primitive handling according to disclosed embodiments.
Figure 13B:
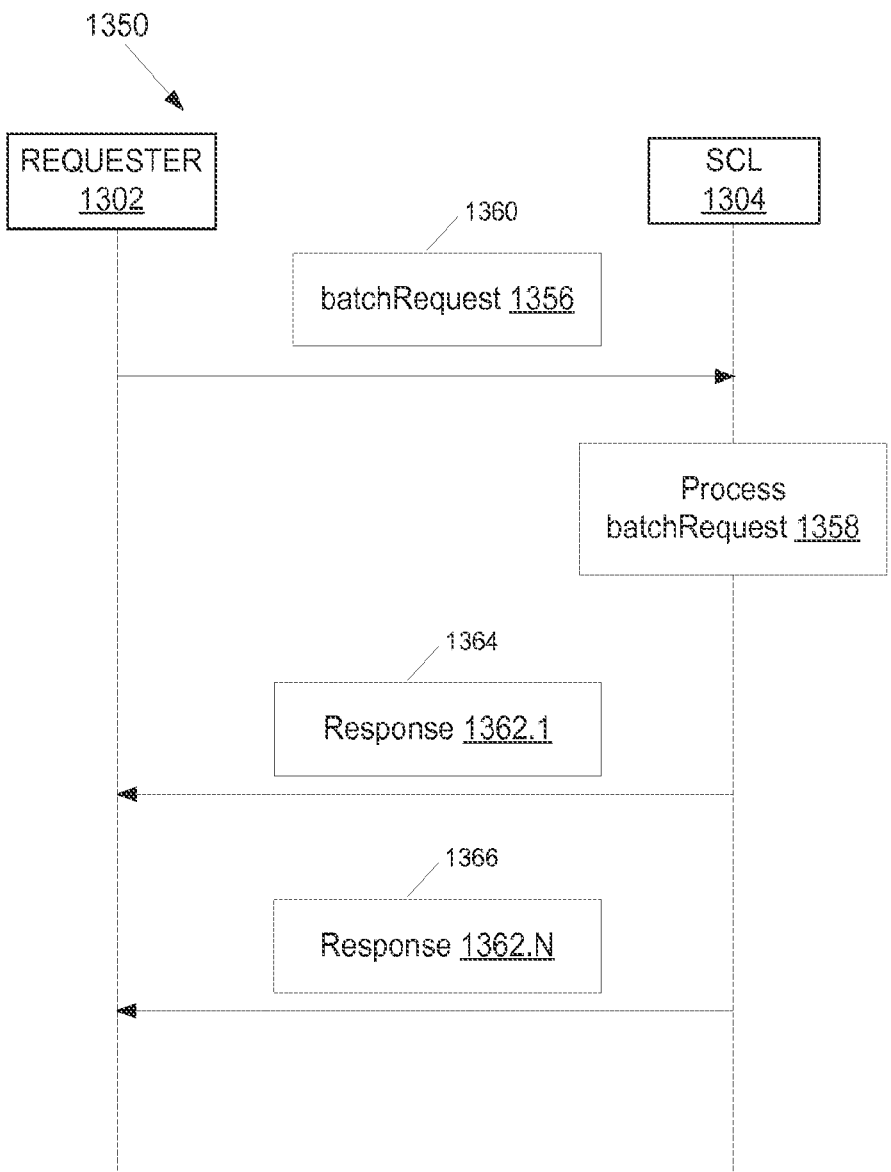

FIGS. 13A and 13B illustrate batch response primitive handling according to disclosed embodiments.

Illustrated in FIGS. 13A, and 13B are requester 1302 and SCL 1304. The method 1300 of FIG. 13A may begin with the requester 1302 sending a batchRequest 1306 at 1310. The batchRequest 1306 may include an indication of how the requester 1302 would like to receive responses to the batchRequest 1306. The method 1300 may continue with process batchRequest 1308. The method 1300 may continue with batchResponse 1312 at 1314. For example, the SCL 1304 may process the batchRequests 1308 and send all the responses back to the requester 1302 in a batchResponse 1312.

The batchResponse 1312 may be requested by the requester 1302 or used by the SCL 1304 for operations create and delete where no response representation is required to be sent to the requester. The batchResponse 1312 may be requested by the requester 1302 or used by the SCL 1304 when response representations can be easily concatenated or aggregated to fit within a single response. The batchResponse 1312 may be requested by the requester 1302 or used by the SCL 1304 when links to resource representations can be included in a single batchResponse 1312 instead of including actual resources representations. For example, the SCL 1304 may store representations in the resource structure 900, 1000 and provide links to the stored representations.

In some embodiments, the batchResponse 1314 may be an indication that the SCL 1304 has stored responses to the batchRequest 1306 within a resource, which in some embodiments may be specified by the requester 1302. For example, the batchRequest 1314 may be from an application 450 requesting that target devices 464 that respond at different times be queried for data. The SCL 1304 may aggregate all the responses from the devices at a universal resource identifier (URI) within a resource structure 900, 1000. When all the responses from the devices 464 have been received and stored, the SCL 1304 may send the batchResponse 1312 to notify the requester 1302 that the responses are ready.

The method 1350 of FIG. 13B may begin with the requester 1302 sending a batchRequest 1356 at 1360. The batchRequest 1356 may include an indication of how the requester 1302 would like to receive responses to the batchRequest 1356. The method 1350 may continue with process batchRequest 1358. The method 1300 may continue with Response 1362.1 at 1364. For example, the SCL 1304 may process the batchRequests 1358 and send some of the responses back to the requester 1302 in a Response 1362.1 and some of the responses back to the requester 1302 in one or more Responses 1362.N. The response 1362.1 through 1362.N may be either batchResponses or individual responses.

For example, two responses 1362.1 and 1361.2 may be sent that are both batch responses in response to a single batchRequest 1356. One batch response 1362.1 may contain responses for all batched requests that completed successfully and another batch response 1362.2 may contain responses of the batchRequest 1356 that encountered errors. In another example, multiple batch responses 1362.1 through 1362.N may be sent where a single batch response is not sufficient due to the size of the responses.

In some embodiments, the responses 1362.1 through 1362.N may be individual responses to the batched requests of the batchRequest 1356. In some embodiments, the individual responses may be sent as they become available during the processRequest 1358. In some embodiments, some responses 1362.1 through 1362.N may be batched responses and some may be individual responses.

Table 4 illustrates a list of attributes of which one or more may be included as part of the batch request primitive. Additional attributes and sub-resources may be included. Different batch primitives may be defined for different CRUD operations or a single primitive may be used for all CRUD operations. If a single primitive is used, the CRUD operation may be specified within a primitive attribute by using a dedicated attribute or within the batchList attribute.

TABLE 4

Batch XXX Request Indication Primitive
'XXX' represents the different primitive types; Create, Retrieve, Update, or Delete for each CRUD operation.

| Primitive attribute | Description |
| --- | --- |
| requestingEntity | Requester issuing batch request |
| targetID | The targeted SCL resource (i.e. batchRequest resource) |
| primitiveType | Indicate the type of primitive if applicable: BATCH_XXX_REQUEST |
| Method | Indicates the CRUD operation to be performed on batched requests. Only applicable if CRUD operation is not specified in batchList attribute or inherently specified by primitive type. |
| batchList | See section 1.3. Used if addressing a virtual batchRequest resource (as defined in section 1.1.1). Optional if addressing a non-virtual batchRequest resource that already has batchList stored in a resource attribute (as defined in section 1.1.2) |

Table 5 illustrates a list of attributes of which one or more may be included as part the batch response primitive. Additional attributes and sub-resources may be included.

Different batch primitives may be defined for different CRUD operations or a single primitive may be used for all CRUD operations. If a single primitive is used, the CRUD operation may be specified within a primitive attribute by using a dedicated attribute or within the batchList attribute.

TABLE 5

Proposed batchXXXResponseConfirm Primitive
'XXX' represents the different primitive types; Create, Retrieve, Update, or Delete for each CRUD operation.

| Primitive attribute | Description |
| --- | --- |
| primitiveType | BATCH_XXX_RESPONSE |
| statusCode | Applicable Status Code(s) |
| sequenceNo | This attribute could be a flag or sequence number to indicate to the requester that multiple responses are being sent. |
| batchResponse | Response representation(s) if applicable. Note if individual responses do not have representations than this attribute may not be included in batch response. For the case of unsuccessful requests, this field may contain information regarding which requests failed. For example, return a list of failing resources in this attribute which implies the requests to resources not in this list were completed successfully. This attribute could also supply one or more links (e.g. URIs) of where responses are stored (e.g. in SCL resources). |

Table 6 illustrates batchList request parameters of which one or more may be included as part of a request of a batchList request of a batchList resource. In some embodiments, the batchList attribute may be a list. Each element within the list may correspond to a single request. In some embodiments, individual list elements, which may be requests, may be addressed and operations performed on them. For example, a new request may be added to the list, a request may be deleted from the list, a request may be updated in the list, and a request may be retrieved from the list. Each request in the list has may have a set of associated parameters.

TABLE 6 batchList Request Parameters

| Name | Abbrev. | Description |
| --- | --- | --- |
| Resource Identifier | Id | Targeted resource(s) identifier (e.g. URI, etc). Identifier may include wildcards (e.g. use of '*' to support a single request targeting multiple resources or attributes) |
| Resource Operation | Ro | RESTful operation to be performed on targeted resource (e.g. (Create, Retrieve, Update, Delete). Operation name may be abbreviated. For example: C—Create R—Retrieve U—Update D—Delete |
| Resource Type | Rt | Type of resource (e.g. Light, Meter, etc) |
| Expiration Time | Et | Expiration time for the resource |
| Search Strings | Ss | List of search information to couple with the resource which may be queried against. |
| Content Type | Ct | Type of content (e.g. MIME type, etc) |
| Content Units | Cu | Content units (kWh, seconds, C, F, etc) |
| Content Representation | Cr | Actual content representation or a link (e.g. URI) to a content representation. May be used for update or create requests. |
| Content Semantics | Cs | Content/data semantics (e.g. format/structure/meaning of individual content fields, etc) |
| Token | Tk | Information to support coupling requests with corresponding responses that are serviced in an asynchronous fashion |

TABLE 6-continued batchList Request Parameters

| Name | Abbrev. | Description |
|---|---|---|
| Context Information | Ci | Context information associated with request (E.g. location of requester, sleep schedule/ state of requester, etc) |
| Request Delay | Qd | Used to specify the min, max, or preferred delay used when processing each of the requests. |
| Response Delay | Rd | Used to specify the min, max, or preferred delay used when processing each of the responses. |
| Response Preferences | rp | Response handling preferences. The following is an example of how this parameter may be formatted: I—Individual responses required for each request S—Single batch response required M—Multiple batch responses are ok R—Store response in SCL resource and provide link to this resource within response (see Response URI) |
| Response URI | Ru | A URI where the SCL may store responses |
| Response Size | Rs | Max size of a batch response |
| Security Credentials | Sc | Security credentials required for request (e.g. authorization credentials, etc) |

The batchList attribute may include information for each of the individual requests within the batch request. The batchList attribute may be initialized by the requester of the batch request and processed by the targeted SCL to extract the resources and attributes needed to perform the batch request.

The batchList attribute may be a primitive attribute or a resource attribute. The batchList attribute may be part of the batch request primitive as a primitive attribute. The SCL may process the batchList primitive. In some embodiments, the batchList may be a resource attribute and may be maintained within the SCL as a batchRequest resource attribute. The batchList resource may be addressed by a requester. The requester may request the batchList resource be updated and retrieved. Once the batchList resource is created within the SCL batchRequest resource, the batchList attribute may be addressed by the requester rather than including the batchList attribute in a batch request primitive.

In some embodiments, batchList may be implemented as a primitive attribute when batchRequest is implemented as a virtual batchRequest resource. In some embodiments, batchList may be implemented as a primitive attribute if the virtual batchRequest resource does not support a batchList resource attribute.

An SCL may use the parameters contained within the batchList to process each of the requests contained in the batchRequest. For example, the SCL may determine which resource to target, which operation to perform on the resource, how to handle response, etc. from the batchList primitive attribute or the batchList resource attribute. The batchList primitive attribute and the batchList resource attribute may include additionally parameters supported by ETSI M2M resource and/or primitive attributes.

Table 7 illustrates embodiments for structuring the batchList attribute and parameters.

TABLE 7

Embodiment for Structuring the batchList Attribute and Parameters

| Example | Action | Description |
|---|---|---|
| 1 | Requester performs a batched retrieve request to a virtual batchRequest resource supported by an SCL. Requests separated by commas and parameters separated by semicolons. | Retrieve scl/batchRequest: batchList = id=/sensors/sensor1;tk=293ABC,rp=I, id=/sensors/sensor2;tk=378REF; rp=I, id=/sensors/sensor3;tk=397FES; rp=I, id=/sensors/sensor4;tk=208JWD; rp=I |
| 2 | | Retrieve scl/batchRequest: batchList = </sensors/sensor1>;tk="293ABC",rp="I", </sensors/sensor2>;tk="378REF"; rp="I", </sensors/sensor3>;tk="397FES"; rp="I", </sensors/sensor4>;tk="208JWD"; rp="I" |

Illustrated in Table 7 in example 1 and 2 is the primitive retrieve. Both examples 1 and 2 include four requests each of which are retrieve and are batched together in the batchList attribute. Since the batchList attribute in both examples 1 and 2 does not contain operations for the individual requests. The operation specified by the primitive, which is retrieve in example 1 and 2 is used as the operation to perform for each individual request. In some embodiments, the operations for individual requests may be included using a parameter to indicate the operation such as an "ro" parameter.

In some embodiments, batchList may be formatted as a plain-text string. In some embodiments, each request may be separated by a delimiting character such as a comma. Each parameter associated with a request may be separated by a different delimiting character such as semi-colon. A parameter may consist of a name/value pair where each name may be unique and may be assigned a value.

Each request of example 1 includes a targeted resource parameter (id), a specified token parameter (tk) and a response preference indicated a separate response is required (rp).

In example 2, batchList is formatted as a plain-text CoRE Link Format Description string. Existing fields within the CoRE Link Format such as path, resource type (rt) and interface (if) may carry the corresponding parameters defined in Table 5 such as id, rt and ri respectively. In some embodiments, new fields may be added to the CoRE Link Format Description for the additional parameters such as the parameters in Table 5.

Figure 14:
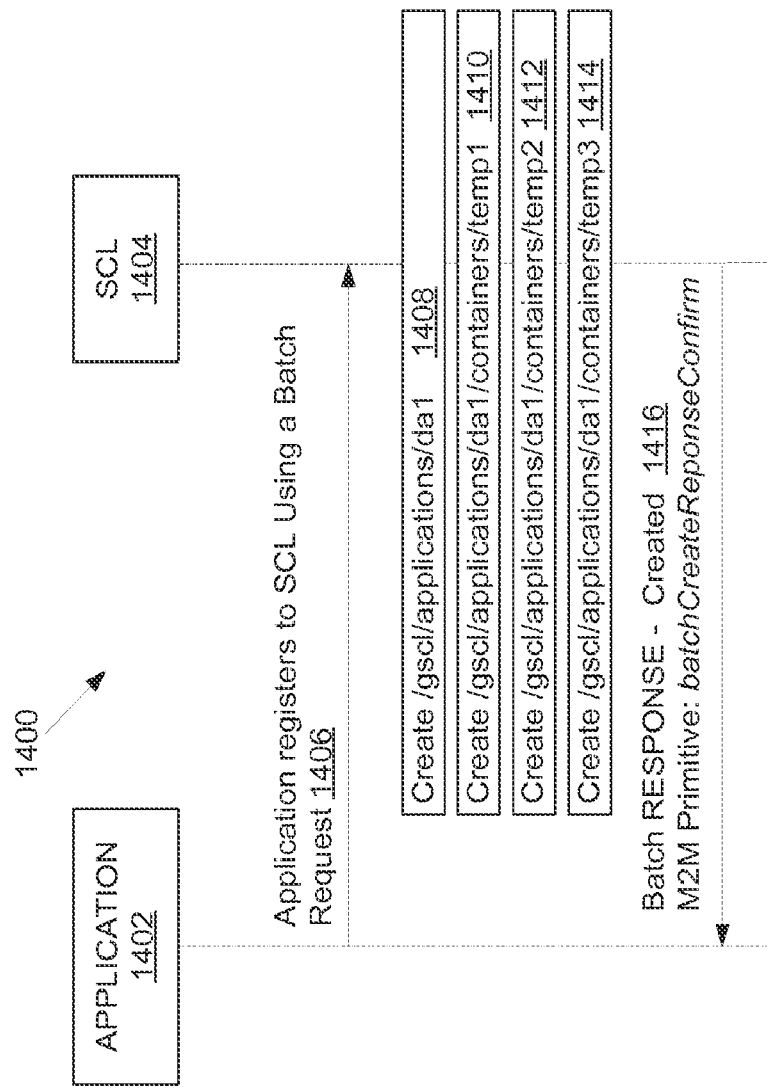
FIG. 14 illustrates a method of batch services according to a disclosed embodiment.

FIG. 14 illustrates a method 1400 of batch services according to a disclosed embodiment. Illustrated in FIG. 14 are an application 1402 and a SCL 1404. The application 1402 may be an application 456, 468, or 450 as described in conjunction with FIG. 4B. The application 1402 may be an ETSI M2M application. The SCL 1404 may be an SCL 453, 452 as described in conjunction with FIG. 4B. The SCL 1404 may be an ETSI M2M SCL.

The method 1400 may begin with the application 1402 registering to SCL using a batch request 1406. The batch request 1406 may be sent to the gscl/batchRequest virtual resource with a batchCreateRequestIndication primitive. Table 8 illustrates an example of message 1406. Included in the payload is the batchList attribute that lists each resource to be created and its associated attributes. For example, application 1402 may be application 468, and M2M device 464*b* may support multiple measurement resources for which corresponding SCL containers need to be created. The SCL 1404 may be an SCL 453. The virtual resource may be the batchRequest 920 illustrated in FIG. 9.

TABLE 8

Example Message 1406 of FIG. 14

| Message | Description |
|---|---|
| Batch Request | POST /gscl/batchRequest<br>HOST: <IP__Addr:Port__#><br>M2M Primitive: batch CreateRequestIndication<br>batchList:<br>id=da1;rt=application;et=<expirationTime>;ss=<searchStrings>,<br>id=temp1;rt=container;et=<expirationTime>;ss=<searchStrings>,<br>id=temp2;rt=container;et=<expirationTime>;ss=<searchStrings><br>id=temp3;rt=container;et=<expirationTime>;ss=<searchStrings> |

The method 1400 may continue with creating gscl/applications/da1 1408. For example, the SCL 1404 receives the batchCreateRequestIndication primitive and parses through the payload to obtain the batchList attribute which contains a list of resources to create. For each resource within the batchList, the resource type and application ID are provided to tell the SCL 1404 what resource to create and what ID to use.

The SCL 1404 determines where in the resource tree to create the resource based on the resource type and/or the URI path (if present in the ID). The SCL 1404 may use the attributes provided in the batchList to configure corresponding attributes in the newly created SCL resource. The attribute names illustrated in Table 7 are abbreviated names. In some embodiments, the entire attribute name may be used. The entire attribute name may be from a standard such as the ETSI M2M standard. The SCL 1404 processes each resource found in the batchList and the SCL 1404 may keep track of the success or failure of each process request.

When the SCL 1404 has serviced all the resource requests in the batchList, it may generate a successful batchCreateResponseConfirm primitive if all the resources were created successfully. If any resource was not created properly, the SCL will generate an unsuccessful batchCreateResponseConfirm message.

The method may continue with batch response-created 1416. For example, the SCL 1404 may send batch response-created indicating that all the resources specified in the batch request 1406 were successfully created.

Figure 15:
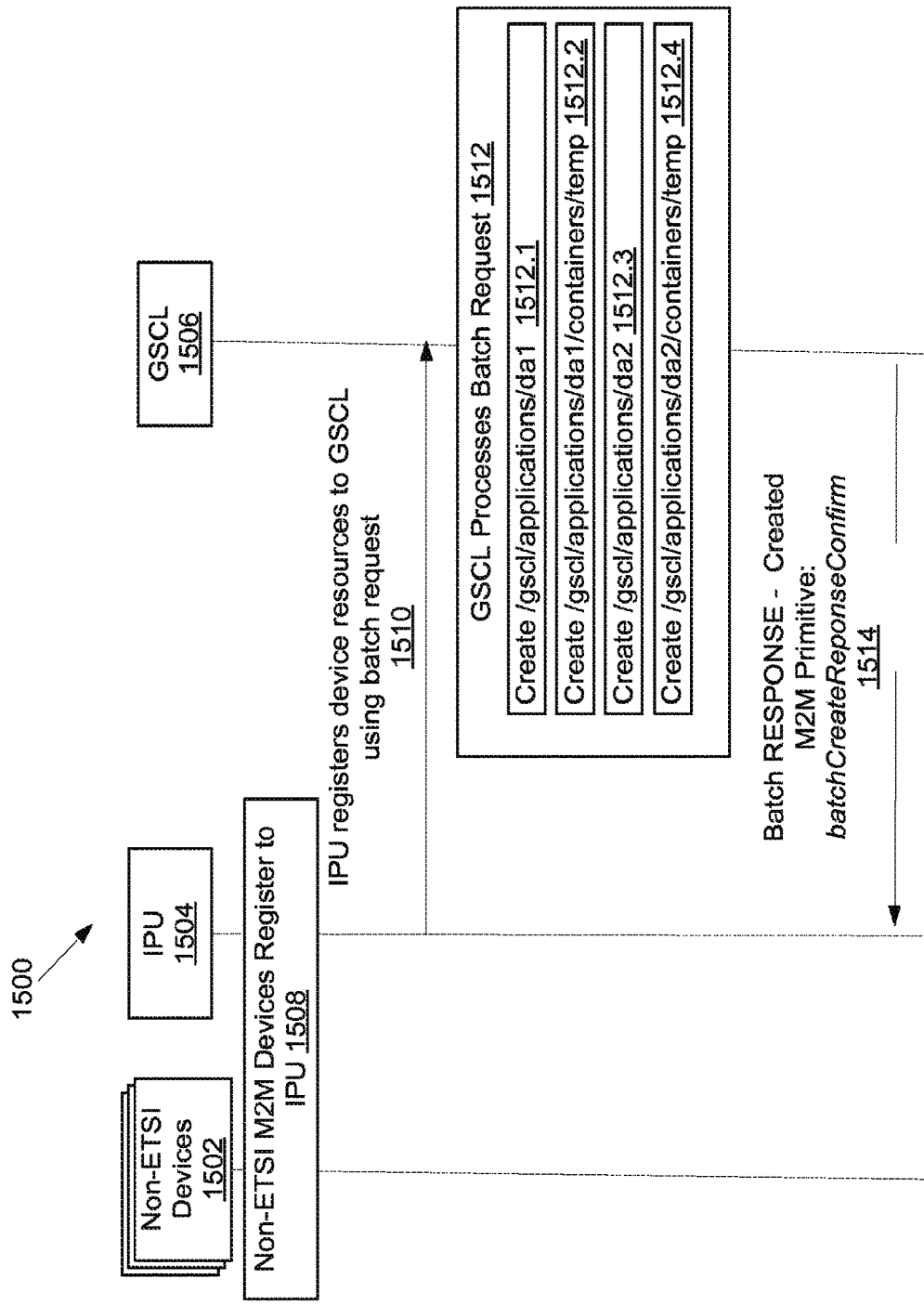
FIG. 15 illustrates a method of batch services according to a disclosed embodiment.

FIG. 15 illustrates a method 1500 of batch services according to a disclosed embodiment. Illustrated in FIG. 15 are non-ETSI devices 1502, ETSI M2M Internetworking proxies 1504, and a gateway service capability layer (GSCL) 1506. The non-ETSI devices 1502 may be devices that are not ETSI compliant devices. For example, M2M device 464*a* (FIG. 4B) may be a non-ETSI device 1502. The ETSI M2M Internetworking proxies 1504 may be an application that interfaces between the non-ETSI devices 1502 and the GSCL 1506. For example, the ETSI M2M Internetworking proxies 1504 may be application 456 or 450 of FIG. 4*b*.

The method 1500 may begin with non-ETSI M2M devices registering to IPU 1508. For example, application 468 may register M2M devices 464*a* with a M2M Gateway 458.

The method 1500 may continue with IPU registering device resources to GSCL 1510. For example, the application 468 may send a batch request to the M2M Gateway 458. Table 9 illustrates an example batch request that application 468 may send to M2M Gateway 458.

TABLE 9

Example Message 1510 of FIG. 15

| Message | Description |
|---|---|
| Batch Request | POST /gscl/batchRequest<br>HOST: <IP__Addr:Port__#><br>M2M Primitive: batch CreateRequestIndication<br>batchList:<br>id=da1;rt=application;et=<expirationTime>;ss=<searchStrings>,<br>id=temp;rt=container;et=<expirationTime>;ss=<searchStrings>,<br>id=da2;rt=application;et=<expirationTime>;ss=<searchStrings>,<br>id=temp;rt=container;et=<expirationTime>;ss=<searchStrings> |

The method 1500 may continue with GSCL processing batch request 1512. For example, the M2M Gateway 458 may perform the example create operations 1512.1, 1512.2, 1512.3, and 1512.4 illustrated in FIG. 15. The method 1500 may continue with batch response created 1514. For example, the M2M gateway 458 may send a batch response 1514 to the application 468. The batch response 1514 may include information as illustrated in the example batch response 1514 in FIG. 15. The batch response 1514 may indicate whether or not the requests within the batch request 1510 were successful or not and information related to the success or failure of performing the requests in the batch request 1510.

Often an IPU may discover several non-ETSI M2M devices 1502 within an area network that it then needs to register (on behalf of non-ETSI M2M devices 1502) to a Gateway SCL 1506.

Figure 16:
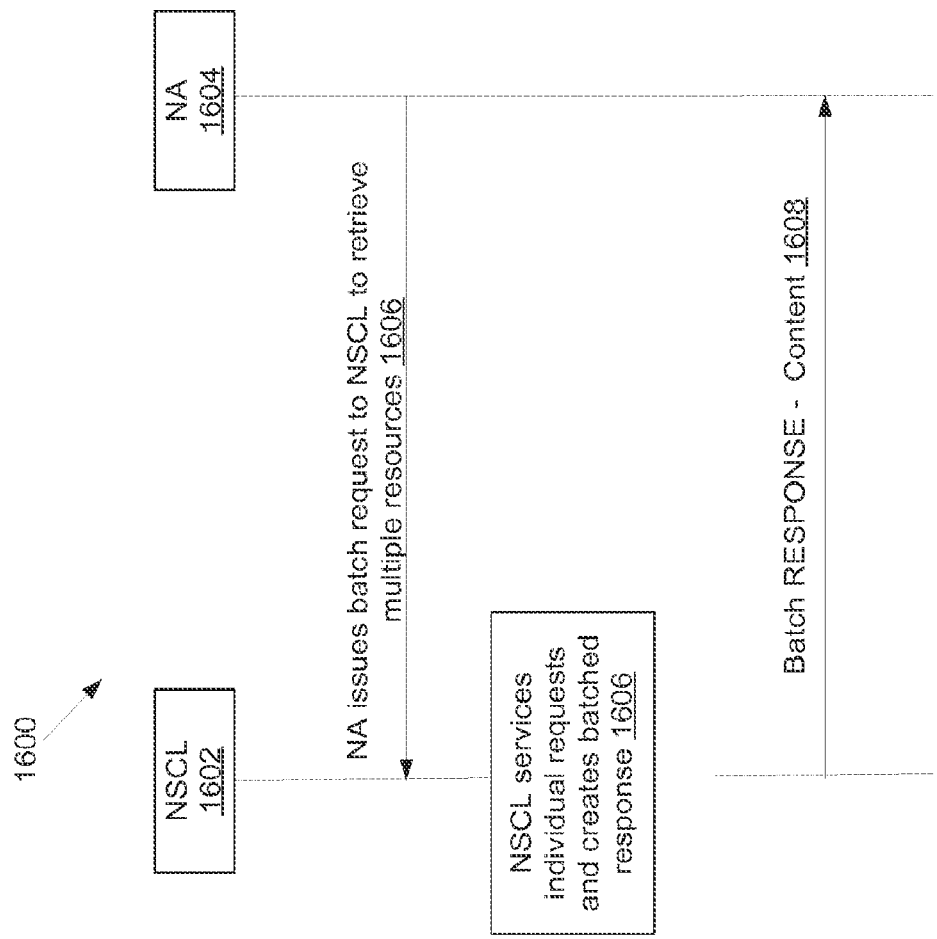
FIG. 16 illustrates a method of batch services according to a disclosed embodiment.

FIG. 16 illustrates a method 1600 of batch services according to a disclosed embodiment. Illustrated in FIG. 16 is an NSCL 1602 and an NA 1604. The NSCL 1602 may be a networked SCL 1602. For example, the NSCL 1602 may be SCL 452 of FIG. 4B. The NA 1604 may be application 450 or application 456.

The method 1600 may begin with the NA 1604 sending a batch request 1606. The batch retrieve 1606 may be a batch request that indicates to the NSCL 1602 to retrieve from multiple resources 1606. An example message for 1606 is illustrated in Table 10.

TABLE 10

Example Message 1606 of FIG. 16

| Message | Description |
|---|---|
| Batch Retrieve | RETRIEVE /nscl/batchRequest<br>M2M Primitive: batchRetrieveRequestIndication<br>batchList:<br>id= nscl/scls/gscl/applications/*;tk=234GDC,rp=S |

The method 1600 may continue with the NSCL 1602 services individual requests and creates batched response 1606. For example, the SCL 452 may process a batch request and create a batched response 1606. The SCL 452 may retrieve data from M2M devices.

The method 1600 may continue with the NSCL 1602 sending a batched response 1606 to the NA 1604 at 1608. For example, the SCL 452 may send a batch response that confirms the retrieval of the data along with the data. An example of the batch response 1608 is illustrated in Table 11.

TABLE 11

Example Message 1606 of FIG. 16

| Message | Description |
| --- | --- |
| Batch Response | M2M Primitive: ApplicationReponseConfirm<br>tk=234GDC<br>"app1, meter"<br>"app2, light"<br>"app3, sensor" |

Figure 17:
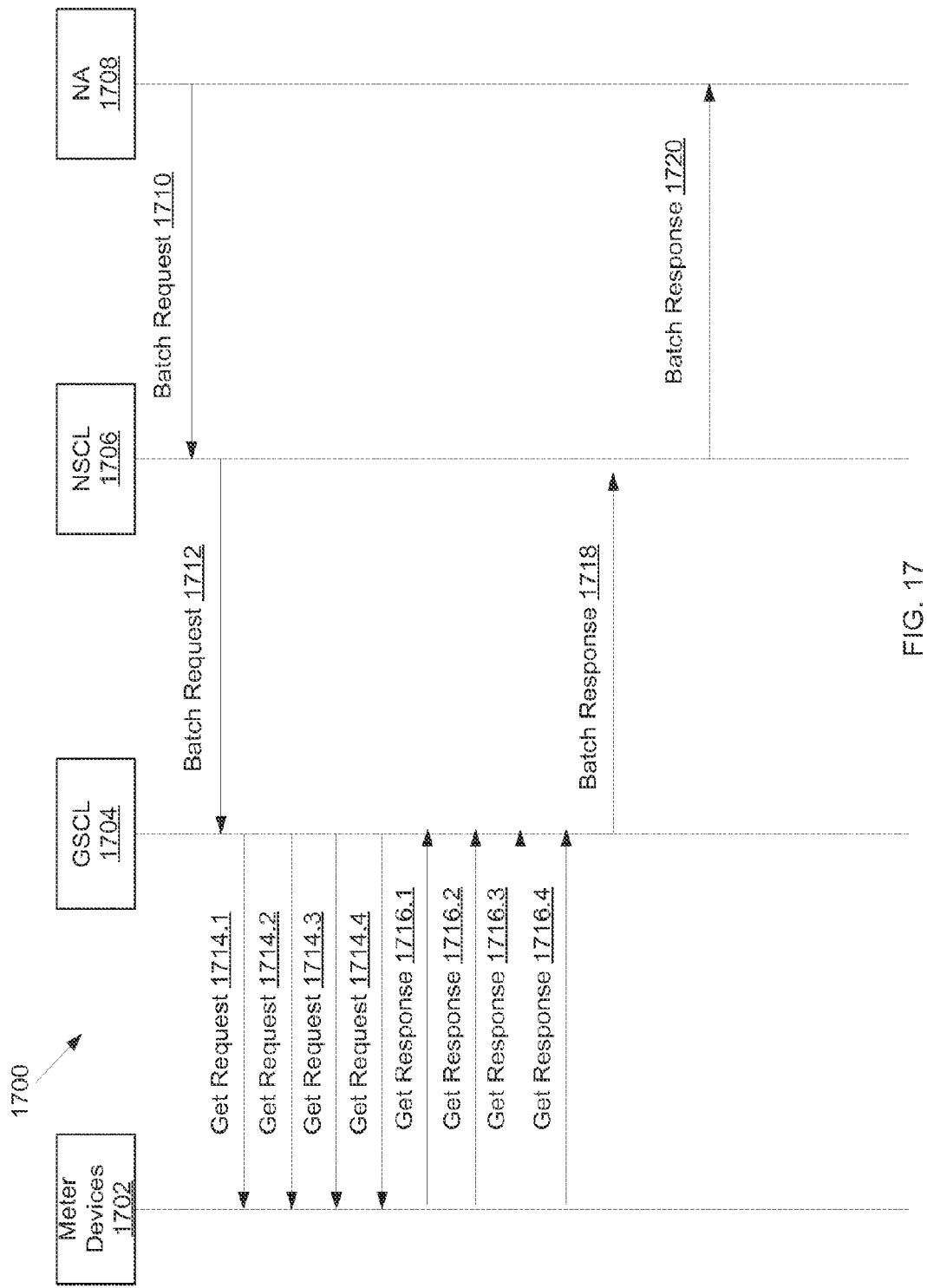
FIG. 17 illustrates a method of batch services according to a disclosed embodiment.

FIG. 17 illustrates a method 1700 of batch services according to a disclosed embodiment.

Illustrated in FIG. 17 are meter devices 1702, GSCL 1704, NSCL 1706 and NA 1708. The meter devices 1702 may be devices such as non-ETSI M2M devices 464a. GSCL 1704 may be M2M Gateway 458. NSCL 1706 may be M2M Server 402. NA 1708 may be application 450.

The NSCL 1602 may be a networked SCL 1602. For example, the NSCL 1602 may be SCL 452 of FIG. 4B. The NA 1604 may be application 450 or application 456.

The method 1700 may begin with NA 1708 sending a batch request 1710 to the NSCL 1706. For example, the batch request 1710 may be a batch request to collect data from meter devices 1702. Table 12 is an example message 1710. The "*" may be a wild card character to indicate multiple meters.

TABLE 12

Example Message 1710 of FIG. 17

| Message | Description |
| --- | --- |
| Batch Request | GET /gscl/batchRequests/<batchRequest><br>M2M Primitive: batchRequestIndication<br>batchList:<br>id=gscl/applications/meter*/containers/contentInstances/latest |

The method 1700 may continue with NSCL 1706 sending a batch request message 1712 to the GSCL 1704. For example, the M2M server 402 may send a batch request to the M2M gateway 458. The M2M server 402 may determine that the devices indicated in the batch request 1710 are not ETSI M2M device (or not standard compliant devices). The M2M server 402 may then determine that the M2M Gateway 458 needs to collect the data. An example, batch request 1712 message is illustrated in Table 13.

TABLE 13

Example Message 1712 of FIG. 17

| Message | Description |
| --- | --- |
| Batch Request | GET /gscl/batchRequests/<batchRequest><br>M2M Primitive: batchRequestIndication<br>batchList:<br>id=gscl/applications/meter*/containers/contentInstances/latest |

The method 1700 may continue with the GSCL 1704 sending separate get requests to the meter devices 1702 at 1714. For example, the M2M Gateway 458 may send separate get requests to a plurality of non-ETSI M2M devices 464a to retrieve monthly meter device readings 1714.

The method 1700 may continue with the GSCL 1704 getting response 1716. For example, the meter devices 1702 may send measurements to the GSCL 1704 at 1716. For example, a plurality of non-ETSI M2M devices 464a (four devices as illustrated in FIG. 17) may take measurements or report measurements already taken and report them to the GSCL 1704 at different times. The GSCL 1704 may collect the measurements.

Although the get requests 1714 are illustrated as all being before the get responses 1716, the get requests 1714 and get responses 1716 may be intertwined. For example, the get response 1716.2 may be received by the GSCL 1704 before the get request 1714.2 is sent.

The method 1700 may continue with a batch response 1718 from the GSCL 1704 to the NSCL 1706. For example, the GSCL 1704 may send a batch response 1718 to the NSCL 1706. Continuing with the example from FIG. 4B, the M2M Gateway 458 may send a batch response to the SCL 453. An example, batch response message 1718 is "<meter 1 reading>, <meter 2 reading>, etc." So that the message is a message with a meter identification and a reading for each meter.

The method 1700 may continue with the NSCL 1706 sending a batch response 1720 to the NA 1708. For example, the SCL 453 may send a batch response 1720 to the application 450. An example, batch response message 1720 is "<meter 1 reading>, <meter 2 reading>, etc." So that the message is a message with a meter identification and a reading for each meter. The method 1700 may end.

Figure 18:
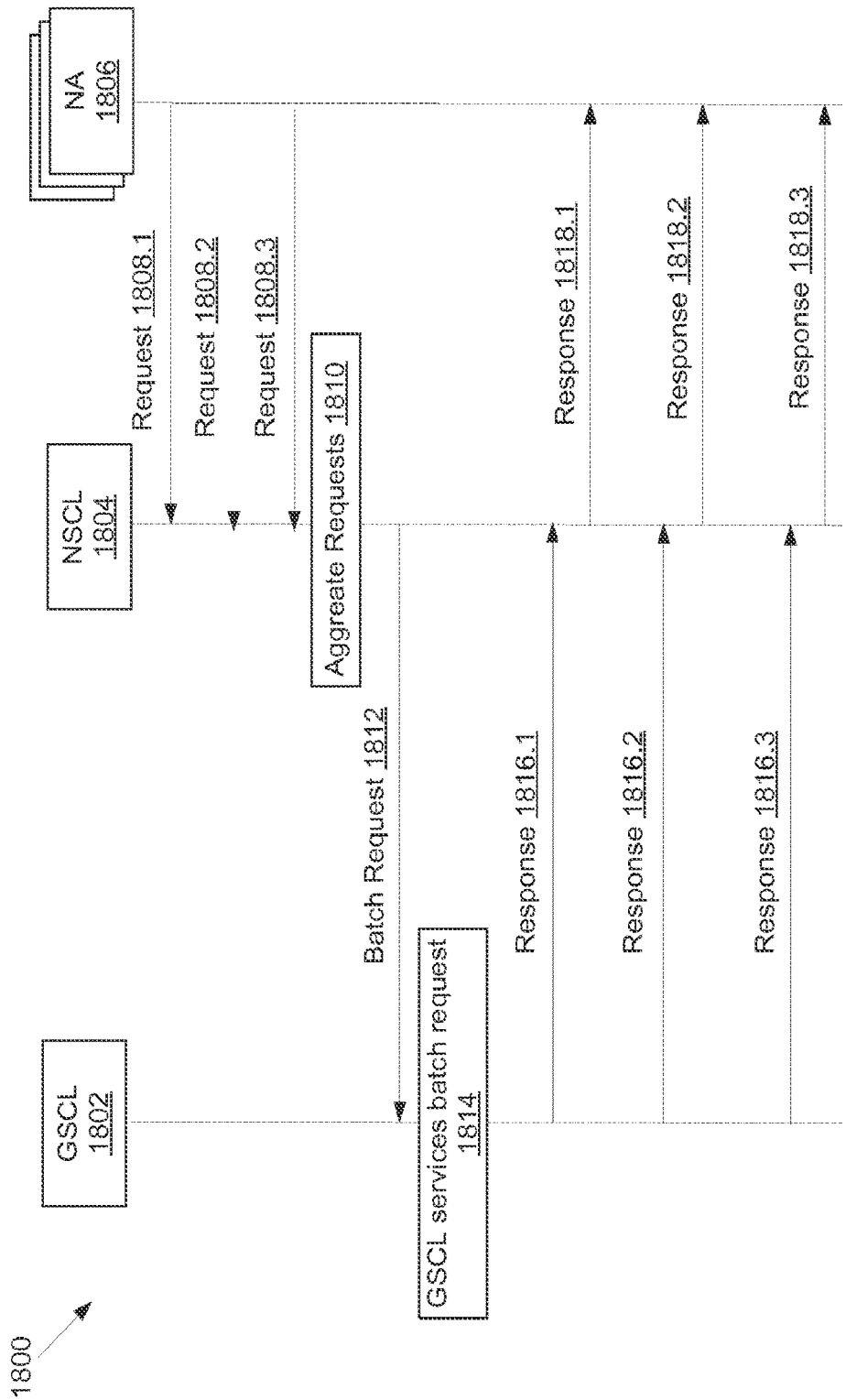
FIG. 18 illustrates a method of batch services according to a disclosed embodiment.

FIG. 18 illustrates a method 1800 of batch services according to a disclosed embodiment. Illustrated in FIG. 18 are GSCL 1702, NSCL 1704, and NA 1706. GSCL 1704 may be M2M Gateway 458. NSCL 1706 may be M2M Server 402. NA 1708 may be one or more applications 450.

The method 1800 may begin with request 1808. For example, the application 450 may send a get request, delete request, and put request to the M2M server 402. Example request message 1808 are illustrated in Table 14.

TABLE 14

Example Messages 1808 of FIG. 18

| Message | Description |
| --- | --- |
| Get Request | GET /gscl/applications/da1<br>Token = 123746<br>M2M Primitive: applicationRetrieveRequestIndication |
| Delete Request | DELETE /gscl/applications/da2<br>Token = 478649<br>M2M Primitive: applicationDeleteRequestIndication |
| Put Request | PUT /gscl/applications/da1/searchStrings<br>Token = 59683<br>M2M Primitive: applicationUpdateRequestIndication<br>"meter" |

The method 1800 may continue with the NSCL 1804 aggregating the requests 1810. The method 1800 may continue with the NSCL 1804 sending a batch request 1812 to the GSCL 1802 at 1812. Table 15 illustrates an example batch request message 1812 based on the request messages of Table 14. Continuing with the example from FIG. 4B, M2M Server 402 may send a batch request to the M2M Gateway 458.

TABLE 15

Example Message 1812 of FIG. 18

| Message | Description |
|---|---|
| Batch Request | POST /gscl/batchRequests/br1<br>M2M Primitive: batchRequestIndication<br>batchList:<br>ro=GET; id=/gscl/applications/da1; tk=123746; rp=I,<br>ro=DELETE; id=/gscl/applications/da2; tk=478649; rp=I,<br>ro=PUT; id=/gscl/applications/da1/searchStrings;cr=meter;<br>tk=59683; rp=I |

The method 1800 may continue with the GSCL services batch requests 1814. For example, the GSCL 1802 may send the individual requests in the batch request of Table 15 to the devices specified in the requests.

The method 1800 may continue with response 1816. For example, the GSCL 1802 may send the responses from the devices as the response are received from the GSCL 1802. Table 16 illustrates example responses that may be received by the GSCL from sending out the requests in Table 17.

TABLE 16

Example Messages 1816 of FIG. 18

| Message | Description |
|---|---|
| Response | RESPONSE - Content<br>Token = 123746<br>M2M Primitive: applicationRetrieveReponseConfirm |
| Response | RESPONSE - Deleted<br>Token = 478649<br>M2M Primitive:applicationDeleteReponseConfirm |
| Response | RESPONSE - Updated<br>Token = 59683<br>M2M Primitive:applicationUpdateReponseConfirm |

The method 1800 may continue with response 1818. For example, the NSCL 1804 may resend the responses 1816 received from the GSCL 1802 to the NA 1806. The method 1800 may end. In some embodiments, the NSCL 1804 may aggregate the responses 1816 and then send a batch response to the NA 1806. In some embodiments, the GSCL 1802 may aggregate the response and send a batch response to the NSCL 1804.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for supporting services at an application service layer (ASL), implemented in a machine-to-machine (M2M) network, the method comprising:
    receiving a batch of requests from an entity addressed to a resource within a representational state transfer (RESTful) service capabilities layer (SCL) resource structure, the resource being a single addressable location in the SCL resource structure, and the requests being targeted to another SCL;
    storing the requests in an attribute in the resource, the resource including another attribute that specifies a time limit for processing the requests;
    processing the requests, the processing including sending the requests to the other SCL; and
    in response to receiving the batch of requests, sending a response to the entity.

2. The method of claim 1, wherein the sending the response further comprises:
    sending, to the entity, a separate response to each of the requests indicated in the batch of requests.

3. The method of claim 1, wherein for at least two of the requests, an operation of the at least two of the requests is the same operation, and the operation is only specified once for the at least two of the requests.

4. The method of claim 1, wherein for at least two of the requests indicated in the batch of requests, two different operations are indicated as part of the at least two of the requests.

5. The method of claim 1, wherein the sending the response further comprises:
    batching responses received from the processing of each of the requests to generate a batch of responses; and
    sending the batch of responses to the entity.

6. The method of claim 1, further comprising:
    in response to receiving the batch of requests, determining the batch of requests is batched based on at least one of a name of the batch of requests, attributes associated with the batch of requests, and an address to which the batch of requests is addressed.

7. The method of claim 1, further comprising:
    in response to receiving the batch of requests, determining an operation to perform on at least two of the requests based on at least one of a name of the batch of requests and an attribute of the batch of requests.

8. The method of claim 1, further comprising:
    determining attributes associated with the batch of requests based on at least one of attributes that are part of the batch of requests and attributes that are associated with an address to which the batch of requests is addressed.

9. The method of claim 1, wherein the ASL is the service capabilities layer (SCL).

10. The method of claim 1, wherein an operation of each respective one of the requests is at least one of create, retrieve, update, and delete.

11. The method of claim 1, wherein the entity is one of an application, a machine to machine application, a machine to machine device, and another ASL.

12. The method of claim 1, wherein the processing the requests further comprises:
    receiving responses to the plurality of requests from the other SCL,
    and wherein sending the response further comprises:
    sending the received responses to the entity.

13. A computer system in a machine-to-machine (M2M) network for supporting services, comprising:

a representational state transfer (RESTful) service capabilities layer (SCL) having a RESTful SCL resource structure, the SCL configured to:
receive a batch of requests from an entity addressed to a resource within the RESTful SCL resource structure, the resource being a single addressable location in the SCL resource structure, and the requests being targeted to another SCL,
store the requests in an attribute in the resource, the resource including another attribute that specifies a time limit for processing the requests,
process the requests, the processing including sending the requests to the other SCL, and
send a response to the entity in response to receiving the batch of requests.

14. The computer system of claim 13, wherein the RESTful SCL is further configured to send, to the entity, a separate response to each of the plurality of requests indicated in the batch of requests.

15. The computer system of claim 13, wherein for at least two of the requests, an operation of the at least two of the requests is the same operation, and the operation is only specified once for the at least two of the requests.

16. The computer system of claim 13, wherein the RESTful SCL is further configured to batch responses received from the processing of the requests and send the batched response to the entity.

17. The computer system of claim 13, wherein the RESTful SCL is further configured to determine the batch of requests is batched based on at least one of a name of the batch of requests, attributes associated with the batch of requests, and an address to which the batch of requests is addressed.

18. The computer system of claim 13, wherein an operation of at least one of the requests is one of create, retrieve, update, and delete.

19. The computer system of claim 13, wherein the entity is one of an application, a machine to machine application, a machine to machine device, and another RESTful SCL.

20. The computer system of claim 13, wherein the RESTful SCL is further configured to process the requests by: receiving responses to the requests from the other SCL, wherein the RESTful SCL is further configured to send the received responses to the entity.

\* \* \* \* \*